US012156004B2

(12) United States Patent
Washio et al.

(10) Patent No.: US 12,156,004 B2
(45) Date of Patent: Nov. 26, 2024

(54) LOUDSPEAKER DEVICE

(71) Applicant: Panasonic Intellectual Property Management Co., Ltd., Osaka (JP)

(72) Inventors: Nobuhiko Washio, Osaka (JP); Akihisa Kawamura, Osaka (JP); Atsushi Sakaguchi, Kyoto (JP); Isao Kakuhari, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 200 days.

(21) Appl. No.: 17/924,890

(22) PCT Filed: Apr. 28, 2021

(86) PCT No.: PCT/JP2021/016894

§ 371 (c)(1),
(2) Date: Nov. 11, 2022

(87) PCT Pub. No.: WO2022/123806

PCT Pub. Date: Jun. 16, 2022

(65) Prior Publication Data

US 2023/0199390 A1 Jun. 22, 2023

(30) Foreign Application Priority Data

Dec. 8, 2020 (JP) ................................ 2020-203136

(51) Int. Cl.

| | |
|---|---|
| ***H04R 3/12*** | (2006.01) |
| ***G10K 11/178*** | (2006.01) |
| ***H04R 1/40*** | (2006.01) |

(52) U.S. Cl.

CPC ......... *H04R 3/12* (2013.01); *G10K 11/17857* (2018.01); *H04R 1/403* (2013.01); *H04R 2430/20* (2013.01)

(58) Field of Classification Search

CPC ...... H04R 3/12; H04R 1/403; H04R 2430/20; G10K 11/17857

See application file for complete search history.

(56) References Cited

U.S. PATENT DOCUMENTS

2011/0293111 A1* 12/2011 Chang .................... H04R 3/005 381/97
2013/0177169 A1* 7/2013 Kanaya .................. H04R 1/323 381/97

FOREIGN PATENT DOCUMENTS

| | | | |
|---|---|---|---|
| JP | 08-019089 | A | 1/1996 |
| JP | 2011-009990 | A | 1/2011 |
| JP | 2013-012991 | A | 1/2013 |

OTHER PUBLICATIONS

International Search Report issued on Jul. 27, 2021 in International Patent Application No. PCT/JP2021/016894, with English translation.

* cited by examiner

*Primary Examiner* — Andrew Sniezek
(74) *Attorney, Agent, or Firm* — Rimon P.C.

(57) ABSTRACT

A loudspeaker device includes: a first loudspeaker that outputs a sound; a second loudspeaker that is adjacent to the first loudspeaker in a predetermined direction and outputs a sound in a direction intersecting with a direction in which the first loudspeaker outputs the sound; and a phase switching circuit that switches between a first switching state and a second switching state, the first switching state being a state in which an input sound signal is inputted to both the first loudspeaker and the second loudspeaker, the second switching state being a state in which the input sound signal is inputted to one of the first loudspeaker and the second loudspeaker while an inverted sound signal obtained by inverting a phase of the input sound signal is inputted to the other of the first loudspeaker and the second loudspeaker.

8 Claims, 27 Drawing Sheets

(a)

(b)

LOUDSPEAKER DEVICE

CROSS-REFERENCE OF RELATED APPLICATIONS

This application is the U.S. National Phase under 35 U.S.C. § 371 of International Patent Application No. PCT/JP2021/016894, filed on Apr. 28, 2021, which in turn claims the benefit of Japanese Patent Application No. 2020-203136, filed on Dec. 8, 2020, the entire disclosures of which Applications are incorporated by reference herein.

TECHNICAL FIELD

The present disclosure relates to a loudspeaker device that is controllable in directionality of a sound field.

BACKGROUND ART

Patent Literature (PTL) 1 discloses a loudspeaker device that includes a pair of loudspeakers positioned back to back with each other on the same straight line and that controls directionality through phase control.

PTL 2 discloses a loudspeaker device that includes a bidirectional open loudspeaker and a nondirectional closed loudspeaker that are positioned to face in the same direction on the same straight line, and that controls transmission of sound to the back.

PTL 3 discloses a loudspeaker device that includes two pairs of loudspeakers positioned in the same plane, the loudspeakers in each pair being positioned opposite to each other, and that controls a sound field by changing the phase inversion.

CITATION LIST

Patent Literature

[PTL 1] Japanese Unexamined Patent Application Publication No. 8-19089
[PTL 2] Japanese Unexamined Patent Application Publication No. 2011-009990
[PTL 3] Japanese Unexamined Patent Application Publication No. 2013-012991

SUMMARY OF INVENTION

Technical Problem

A video conference or a web conference can be held in a conference space that is separated simply by a partition or the like. A participant of this conference would not want voice of the other party outputted from a loudspeaker device to be overheard by an outsider who is outside this conference space. In this case, a reduction in the directionality of the loudspeaker device can keep sound from spreading.

However, to control the directionality of a spatial sound field using any one of the aforementioned conventional loudspeaker devices in the video conference or the web conference, many loudspeakers are to be arranged into a column. Unfortunately, this increases the loudspeaker device in size and in complexity.

The present disclosure provides a loudspeaker device that is capable of controlling directionality of a sound field with a simple configuration.

Solution to Problem

In accordance with an aspect of the present disclosure, a loudspeaker device includes: a first loudspeaker that outputs a sound; a second loudspeaker that is adjacent to the first loudspeaker in a predetermined direction and outputs a sound in a direction intersecting with a direction in which the first loudspeaker outputs the sound; and a phase control circuit that switches between a first switching state and a second switching state, the first switching state being a state in which an input sound signal is inputted to both the first loudspeaker and the second loudspeaker, the second switching state being a state in which the input sound signal is inputted to one of the first loudspeaker and the second loudspeaker while an inverted sound signal is inputted to an other of the first loudspeaker and the second loudspeaker, the inverted sound signal being obtained by inverting a phase of the input sound signal.

Advantageous Effects of Invention

The loudspeaker device according to the present disclosure is capable of controlling directionality of a sound field with a simple configuration.

DESCRIPTION OF EMBODIMENTS (Underlying Knowledge Forming Basis of the Present Disclosure)

Known technologies of controlling the directionality of a sound field include a parametric loudspeaker that uses ultrasound and a line array loudspeaker, for example. However, the former needs many loudspeakers and an ultrasound control circuit, and the latter needs a dedicated circuit for controlling the phase of each loudspeaker.

Furthermore, another known technology is to perform phase control with a dipole loudspeaker device that includes a pair of loudspeakers placed opposite to each other. However, to control the directionality of a spatial sound field using a configuration of the loudspeaker device of this kind, a plurality of loudspeakers are to be spatially arranged. This raises an issue that many loudspeakers are to be used. Moreover, the configuration of the loudspeaker of this kind is unable to achieve a sufficient effect because the presence of people among the plurality of loudspeakers disturbs the sound field. Thus, such a configuration is unsuitable for use in a small space. The present inventors have found the aforementioned issues and reached a subject according to the present disclosure.

The present disclosure provides a loudspeaker device that is capable of controlling directionality of a sound field with a simple configuration.

Hereinafter, certain exemplary embodiments will be described in detail with reference to the accompanying Drawings. However, unnecessarily detailed description may be omitted. For example, detailed explanation of a well-known matter and repeated description of substantially identical structures may be omitted. Such omission makes the following description exclude unnecessary redundancy and be easily understood by those skilled in the art.

The accompanying Drawings and the following Description are provided to help those skilled in the art to well understand the present disclosure, and not to restrict the subject of the claims.

Embodiment 1

The following describes Embodiment 1 with reference to FIG. 1A to FIG. 7.

[1-1. Configuration of Loudspeaker Device]

Figure 1A:
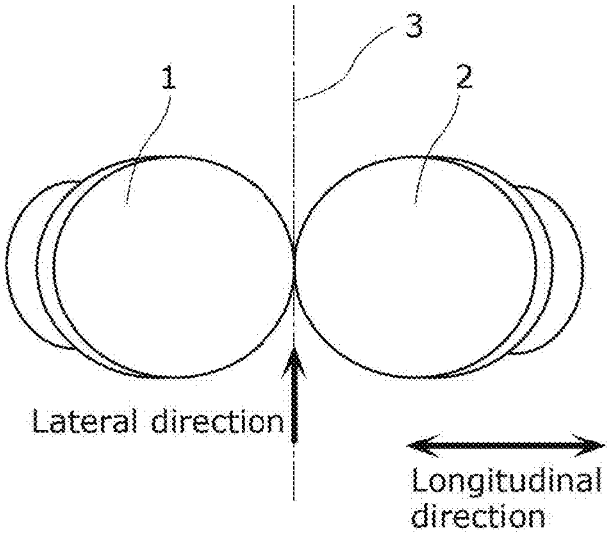
FIG. 1A is a top view illustrating placement of loudspeakers included in a loudspeaker device according to Embodiment 1.
Figure 1B:
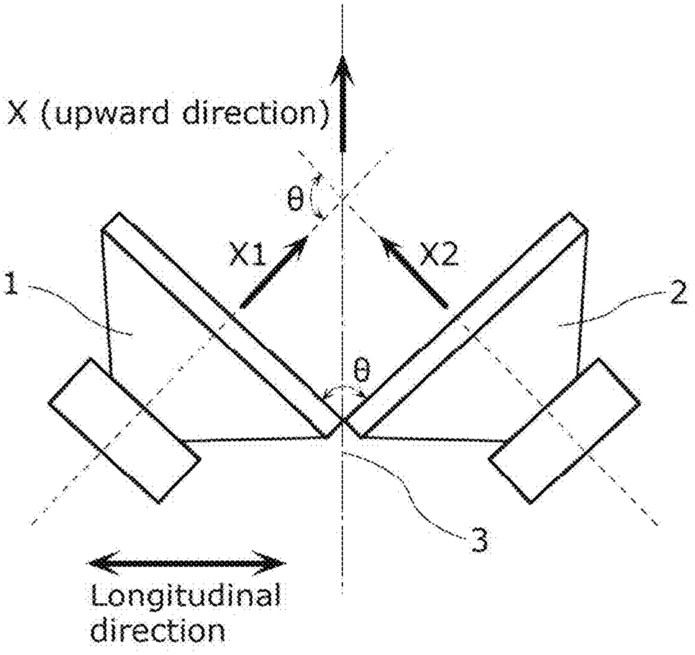
FIG. 1B is a side view illustrating the placement of the loudspeakers included in the loudspeaker device according to Embodiment 1.

First, placement of loudspeaker 1 and loudspeaker 2 included in loudspeaker device 100 (see FIG. 2A and FIG. 2B described later) according to Embodiment 1 is described with reference to FIG. 1A and FIG. 1B. FIG. 1A is a top view illustrating placement of loudspeaker 1 and loudspeaker 2 included in loudspeaker device 100 according to Embodiment 1. FIG. 1B is a side view illustrating the placement of loudspeaker 1 and loudspeaker 2 included in loudspeaker device 100 according to Embodiment 1.

Loudspeaker device 100 includes loudspeaker 1 and loudspeaker 2. Loudspeaker 1 is an example of a first loudspeaker, and loudspeaker 2 is an example of a second loudspeaker. Loudspeaker 1 and loudspeaker 2 have the same characteristics and the same performance. As illustrated in FIG. 1A and FIG. 1B, loudspeaker 1 and loudspeaker 2 are placed symmetrically with respect to reference plane 3, which is a virtual plane, so that one ends of respective diaphragms are closely adjacent to or in touch with each other.

In the present specification below, direction X combining direction X1 in which loudspeaker 1 outputs a sound with direction X2 in which loudspeaker 2 outputs a sound refers to the "upward direction". A direction perpendicular to each of direction X1 and direction X2 refers to the lateral direction. A direction perpendicular to each of the upward direction and the lateral direction refers to the longitudinal direction. The longitudinal direction is an example of a predetermined direction. Reference plane 3 includes direction X (the upward direction) and the lateral direction.

Loudspeaker 1 and loudspeaker 2 are placed adjacent to each other in the longitudinal direction. Loudspeaker 1 and loudspeaker 2 are placed symmetrically with respect to reference place 3 so that the respective directions in which the sounds are outputted (emitted) intersect with each other when viewed in the lateral direction as illustrated in FIG. 1B. Direction X1 in which loudspeaker 1 outputs the sound forms angle θ from 60° to 120° with direction X2 in which loudspeaker 2 outputs the sound. Angle θ can be set as appropriate according to desired directionality characteristics.

Moreover, loudspeaker 1 and loudspeaker 2 are placed so that one of loudspeaker 1 and loudspeaker 2 is located in the direction in which the other outputs the sound. Here, the phrase "one of loudspeaker 1 and loudspeaker 2 is located in the direction in which the other outputs the sound" is described more specifically. For example, when loudspeaker 1 is viewed from the direction perpendicular to direction X1, loudspeaker 2 is located forward of loudspeaker 1 (in the direction in which loudspeaker 1 outputs the sound) in the direction parallel to direction X1. In other words, loudspeaker 1 and loudspeaker 2 are arranged opposite to each other at an angle. In the present specification below, this arrangement is referred to as "acute-angled opposite arrangement".

Note that loudspeaker 1 and loudspeaker 2 may be configured so that angle θ described above is variable. With an adjustment made to angle θ, the directionality characteristics in a target frequency band and a range of the directionality can be adjusted.

Figure 2A:
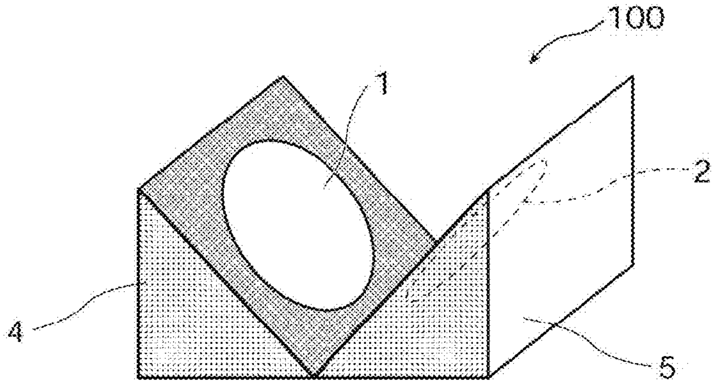
FIG. 2A is a perspective view of the loudspeaker device facing upward, according to Embodiment 1.
Figure 2B:
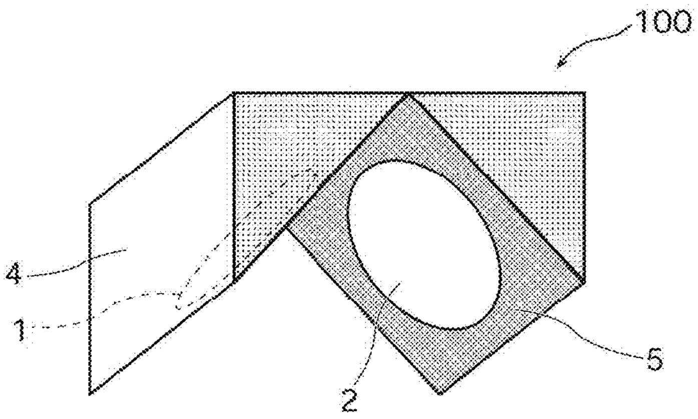
FIG. 2B is a perspective view of the loudspeaker device facing downward, according to Embodiment 1.

Next, a configuration of loudspeaker device 100 is described with reference to FIG. 2A and FIG. 2B. FIG. 2A is a perspective view of loudspeaker device 100 facing upward, according to Embodiment 1. FIG. 2B is a perspective view of loudspeaker device 100 facing downward, according to Embodiment 1.

As illustrated in FIG. 2A and FIG. 2B, loudspeaker device 100 includes loudspeaker 1, loudspeaker 2, enclosure 4, and enclosure 5. Loudspeaker 1 is accommodated in enclosure 4 and capable of outputting a sound outside enclosure 4. Loudspeaker 2 is accommodated in enclosure 5 and capable of outputting a sound outside enclosure 5. Each of enclosure 4 and enclosure 5 is a closed loudspeaker box in the shape of a triangular prism, for example.

Enclosure 4 and enclosure 5 are placed so that loudspeaker 1 and loudspeaker 2 are in a relative positional relationship as illustrated in FIG. 1A and FIG. 1B. Thus, when viewed from the lateral direction, loudspeaker device 100 has the center shaped like a valley and includes loudspeaker 1 and loudspeaker 2 arranged opposite to each other at an angle, with one of loudspeaker 1 and loudspeaker 2 on one slope of the valley and the other on the other slope of the valley. Enclosure 4 and enclosure 5 are connected to each other so that the relative position is fixed. However, enclosure 4 and enclosure 5 may be formed into one piece. Enclosure 4 and enclosure 5 may be separate if an electrical configuration described later is satisfied.

Although each of enclosure 4 and enclosure 5 is in the shape of a triangular prism in the present embodiment, this is not intended to be limiting. Any shape, such as a rectangular prism or a cylinder, may be used if the relative position between loudspeaker 1 and loudspeaker 2 is maintained as in FIG. 1A and FIG. 1B.

When each of loudspeaker 1 and loudspeaker 2 of loudspeaker device 100 is placed facing obliquely upward with respect to the vertical direction as illustrated in FIG. 2A, this placement refers to "upward placement". On the other hand, when each of loudspeaker 1 and loudspeaker 2 of loudspeaker device 100 is placed facing obliquely downward with respect to the vertical direction as illustrated in FIG. 2B, this placement refers to "downward placement". For loudspeaker device 100 in the downward placement, the upward direction viewed from loudspeaker device 100 (direction X) refers to the downward direction (the vertically downward direction).

Figure 3A:
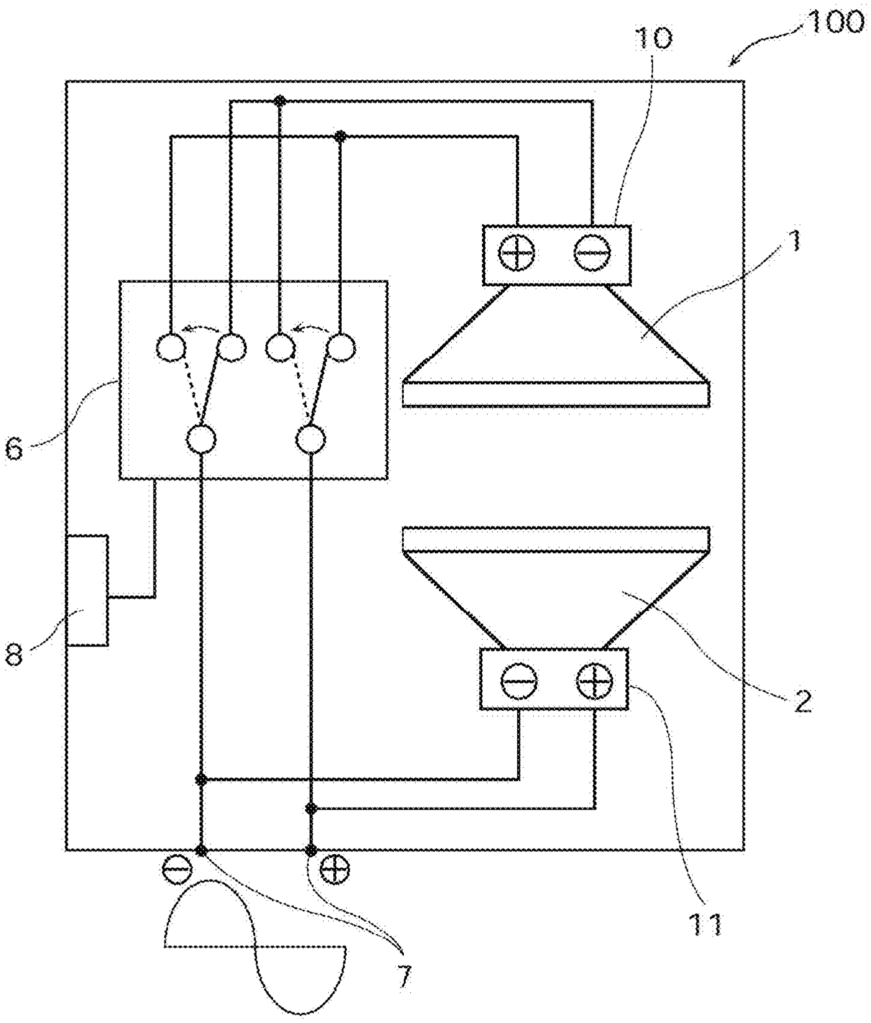
FIG. 3A is a diagram illustrating an electrical configuration of the loudspeaker device according to Embodiment 1.
Figure 3B:
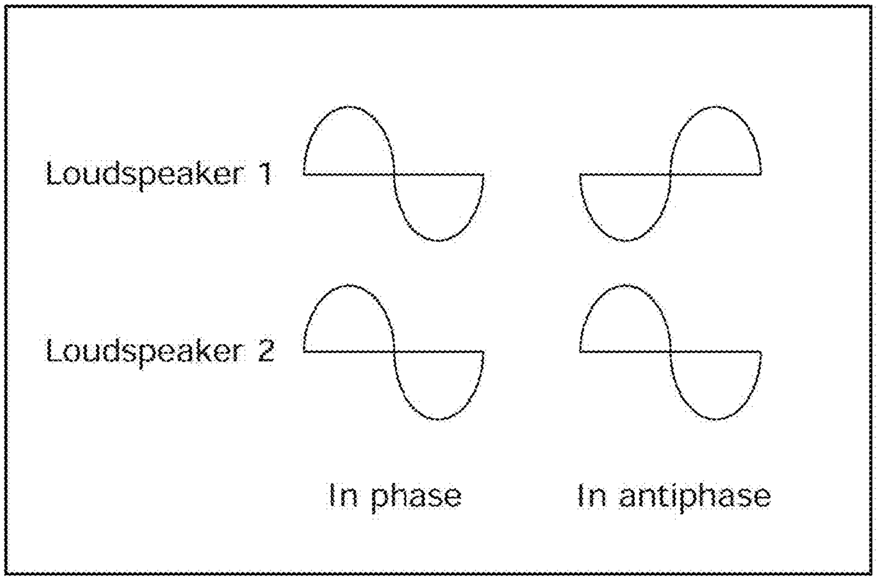
FIG. 3B is a diagram illustrating a phase relationship of the loudspeaker device according to Embodiment 1.

Next, an electrical configuration of loudspeaker device 100 according to Embodiment 1 is described with reference to FIG. 3A and FIG. 3B. FIG. 3A is a diagram illustrating the electrical configuration of loudspeaker device 100 according to Embodiment 1. FIG. 3B is a diagram illustrating a phase relationship of loudspeaker device 100 according to Embodiment 1.

As illustrated in FIG. 3A, loudspeaker device 100 has the electrical configuration that includes input terminal 7, phase switching circuit 6, and selector switch 8 in addition to loudspeaker 1 and loudspeaker 2 described above. Phase switching circuit 6 is an example of a phase control circuit.

Input terminal 7 externally receives an input sound signal (hereinafter, also referred to as a "loudspeaker input signal"). Loudspeaker 1 includes input terminal 10. Loudspeaker 2 includes input terminal 11. Phase switching circuit 6 is electrically connected between input terminal 10 of loudspeaker 1 and input terminal 7.

Input terminal 10 of loudspeaker 1 receives an input sound signal or an inverted sound signal from phase switching circuit 6. The inverted sound signal is obtained by inverting the phase of the input sound signal. Loudspeaker 1 outputs a sound based on the input sound signal or the inverted sound signal inputted to input terminal 10.

Moreover, input terminal 11 of loudspeaker 2 directly receives the input sound signal inputted to input terminal 7. More specifically, a positive terminal of input terminal 7 is electrically connected to a positive terminal of input terminal 11 of loudspeaker 2. A negative terminal of input terminal 7 is electrically connected to a negative terminal of input terminal 11 of loudspeaker 2. Loudspeaker 2 outputs a sound based on the input sound signal inputted to input terminal 11.

Phase switching circuit 6 switches connection between input terminal 7 and input terminal 10 of loudspeaker 1 between two ways. One way is to connect the terminals of the same polarity, and the other way is to connect the terminals of opposite polarities. Assume that "input terminal 7 is connected to input terminal 10 of loudspeaker 1 at the same polarity." In this case, the positive terminal of input terminal 7 is electrically connected to the positive terminal of input terminal 10 of loudspeaker 1, and the negative terminal of input terminal 7 is electrically connected to the negative terminal of input terminal 10 of loudspeaker 1. At this time, phase switching circuit 6 outputs the input sound signal received from input terminal 7, to input terminal 10 of loudspeaker 1 as it is (without inverting the phase). Furthermore, assume that "input terminal 7 is connected to input terminal 10 of loudspeaker 1 at opposite polarities." In this case, the positive terminal of input terminal 7 is electrically connected to the negative terminal of input terminal 10 of loudspeaker 1, and the negative terminal of input terminal 7 is electrically connected to the positive terminal of input terminal 10 of loudspeaker 1. At this time, phase switching circuit 6 outputs the inverted sound signal obtained by inverting the phase of the input sound signal received from input terminal 7, to input terminal 10 of loudspeaker 1.

In this way, phase switching circuit 6 is capable of switching between a first switching state (hereinafter, also referred to as the "in-phase state") and a second switching state (hereinafter, also referred to as the "in-antiphase state"). In the first switching state, phase switching circuit 6 outputs the input sound signal received from input terminal 7, to input terminal 10 of loudspeaker 1 as it is. Thus, in the first switching state, input terminal 10 of loudspeaker 1 receives the input sound signal outputted from phase switching circuit 6, and input terminal 11 of loudspeaker 2 receives the input sound signal outputted from input terminal 7. On the other hand, in the second switching state, phase switching circuit 6 outputs the inverted sound signal obtained by inverting the phase of the input sound signal received from input terminal 7, to input terminal 10 of loudspeaker 1. Thus, in the second switching state, input terminal 10 of loudspeaker 1 receives the inverted sound signal outputted from phase switching circuit 6, and input terminal 11 of loudspeaker 2 receives the input sound signal outputted from input terminal 7.

Thus, as illustrated in FIG. 3B, phase switching circuit 6 is capable of switching the sound signal to be inputted to input terminal 10 of loudspeaker 1 to a sound signal in phase or in antiphase with the sound signal to be inputted to input terminal 11 of loudspeaker 2. In this way, phase switching circuit 6 is capable of switching the state of the sounds outputted from loudspeaker 1 and loudspeaker 2 between the in-phase state and the in-antiphase state. More specifically, loudspeaker 1 and loudspeaker 2 are electrically connected to be able to output sounds that are in phase or in antiphase with each other.

Selector switch 8 receives an operation from a user, and outputs a signal in response to the received operation to phase switching circuit 6. On the basis of the signal from selector switch 8, phase switching circuit 6 is capable of switching between the in-phase state and the in-antiphase state. Note that phase switching circuit 6 may be used as a mechanical switching circuit and that selector switch 8 may be used as a mechanical selector switch. Then, by mechanically working with an operation of the selector switch, phase switching circuit 6 may switch the state between the in-phase state and the in-antiphase state.

[1-2. Operation of Loudspeaker Device]

Next, an operation of loudspeaker device 100 according to Embodiment 1 is described.

Figure 4:
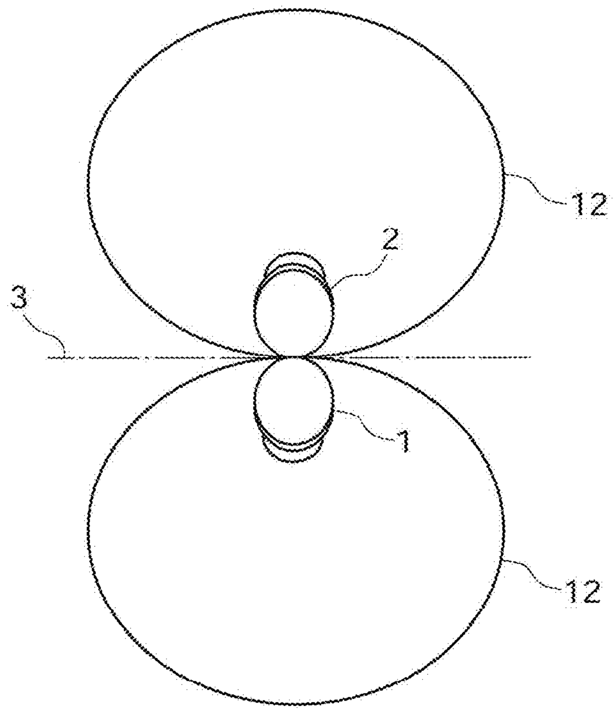
FIG. 4 is a top view illustrating sound field characteristics of the loudspeaker device in an in-antiphase state, according to Embodiment 1.
Figure 5:
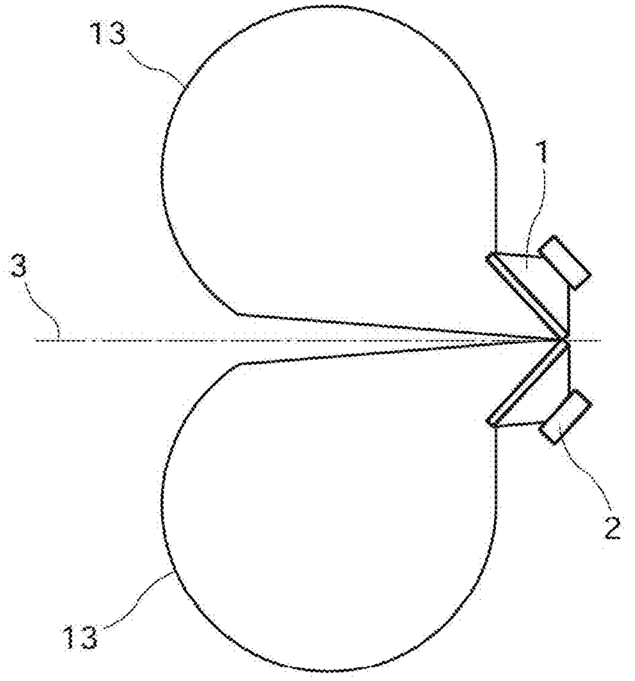
FIG. 5 is a side view illustrating the sound field characteristics of the loudspeaker device in the in-antiphase state, according to Embodiment 1.

First, the following describes an operation of loudspeaker device 100 that is performed when phase switching circuit 6 switches to the in-antiphase state, with reference FIG. 4 and FIG. 5. FIG. 4 is a top view illustrating sound field characteristics of loudspeaker device 100 in the in-antiphase state, according to Embodiment 1. FIG. 4 illustrates the sound field characteristics viewed from the upward direction, when phase switching circuit 6 switches to the in-antiphase state and the sound is outputted from each of loudspeaker 1 and loudspeaker 2. FIG. 5 is a side view illustrating the sound field characteristics of loudspeaker device 100 in the in-antiphase state, according to Embodiment 1. FIG. 5 illustrates the sound field characteristics viewed from the lateral direction, when phase switching circuit 6 switches to the in-antiphase state and the sound is outputted from each of loudspeaker 1 and loudspeaker 2.

Each of sound field curve 12 in FIG. 4 and sound field curve 13 in FIG. 5 is a contour line that connects points of equal sound pressure. For the sake of simplicity, FIG. 4 and FIG. 5 illustrate only loudspeaker 1 and loudspeaker 2 among the components included in loudspeaker device 100.

Loudspeaker 1 and loudspeaker 2 outputs the sounds that are in antiphase with each other. Thus, the sounds in antiphase overlap on reference plane 3. As illustrated in FIG. 4 and FIG. 5, the sound field characteristics in this case show that the sounds weaken towards reference plane 3 because the sounds outputted from loudspeaker 1 and loudspeaker 2 cancel each other out on reference plane 3. On this account, the sound pressure of the sound outputted from loudspeaker device 100 decreases in the lateral direction and the upward direction of loudspeaker device 100. In contrast, the sounds outputted from loudspeaker 1 and loudspeaker 2 propagate substantially without cancelling each other out, in the longitudinal direction and the obliquely upward directions (direction X1 and direction X2 in FIG. 1B).

Thus, the switching to the in-antiphase state by phase switching circuit 6 of loudspeaker device 100 according to the present embodiment enables the sound to be outputted at a constant sound pressure in the longitudinal direction. At the same time, this switching enables the sound pressure of the sound outputted in the lateral direction and upward direction to be reduced as compared with the longitudinal direction.

Figure 6:
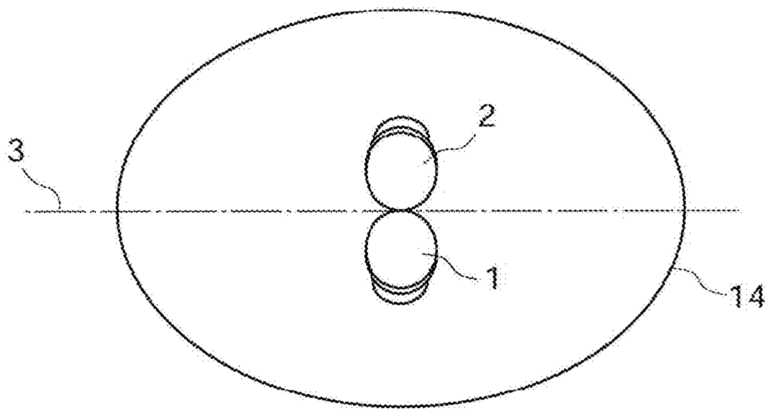
FIG. 6 is a top view illustrating sound field characteristics of the loudspeaker device in an in-phase state, according to Embodiment 1.
Figure 7:
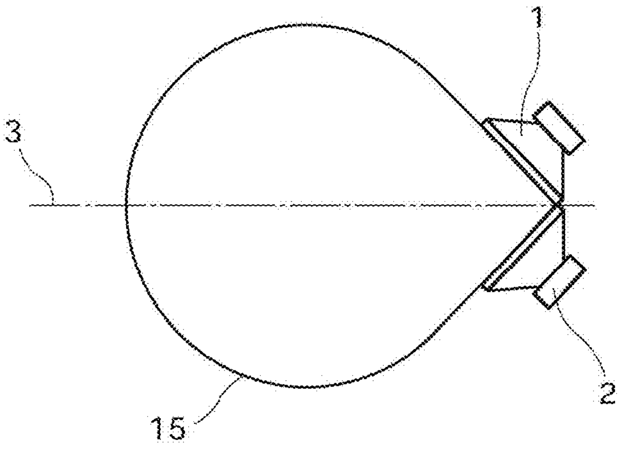
FIG. 7 is a side view illustrating the sound field characteristics of the loudspeaker device in the in-phase state, according to Embodiment 1.

Next, the following describes an operation of loudspeaker device 100 that is performed when phase switching circuit 6 switches to the in-phase state, with reference FIG. 6 and FIG. 7. FIG. 6 is a top view illustrating sound field characteristics of loudspeaker device 100 in the in-phase state, according to Embodiment 1. FIG. 6 illustrates the sound field characteristics viewed from the upward direction, when phase switching circuit 6 switches to the in-phase state and the sound is outputted from each of loudspeaker 1 and loudspeaker 2. FIG. 7 is a side view illustrating the sound field characteristics of loudspeaker device 100 in the in-phase state, according to Embodiment 1. FIG. 7 illustrates the sound field characteristics viewed from the lateral direction, when phase switching circuit 6 switches to the in-phase state and the sound is outputted from each of loudspeaker 1 and loudspeaker 2.

Each of sound field curve 14 illustrated in FIG. 6 and sound field curve 15 illustrated in FIG. 7 is a contour line that connects points of equal sound pressure. For the sake of simplicity, FIG. 6 and FIG. 7 illustrate only loudspeaker 1 and loudspeaker 2 among the components included in loudspeaker device 100.

Loudspeaker 1 and loudspeaker 2 outputs the sounds that are in phase with each other. Thus, the sounds in phase overlap on reference plane 3. As illustrated in FIG. 6 and FIG. 7, the sound field characteristics in this case show that the sounds outputted from loudspeaker 1 and loudspeaker 2 do not cancel each other out towards reference plane 3 because these sounds are in phase.

Thus, the switching to the in-phase state by phase switching circuit 6 of loudspeaker device 100 according to the present embodiment enables the sounds to be outputted in all directions around loudspeaker device 100.

As described above, the directionality of the sounds outputted from loudspeaker 1 and loudspeaker 2 of loudspeaker device 100 according to the present embodiment can be controlled through the operation of the user. This allows the user to use loudspeaker device 100 that outputs the sound having the directionality that is more suitable for the situation.

[1-3. Advantageous Effects]

As described above, loudspeaker device 100 according to the present embodiment includes: loudspeaker 1 that outputs a sound; loudspeaker 2 that is adjacent to loudspeaker 1 in the longitudinal direction and outputs a sound in a direction intersecting with a direction in which loudspeaker 2 outputs the sound; and phase control circuit 6 that is capable of switching between: a first switching state in which an input sound signal is inputted to both loudspeaker 1 and loudspeaker 2; and a second switching state in which the input sound signal is inputted to one of loudspeaker 1 and loudspeaker 2 while an inverted sound signal, which is obtained by inverting a phase of the input sound signal, is inputted to the other of loudspeaker 1 and loudspeaker 2.

This enables phase switching circuit 6 to switch the sounds outputted from loudspeaker 1 and loudspeaker 2 between the in-phase state and the in-antiphase phase. When the sounds outputted from loudspeaker 1 and loudspeaker 2 are switched to the in-phase state, the sounds can be outputted in all directions around loudspeaker device 100. On the other hand, when the sounds outputted from loudspeaker 1 and loudspeaker 2 are switched to the in-antiphase state, the sound pressure can vary with the listening position because the sound fields created by loudspeakers 1 and 2 cancel each other out near reference plane 3. To be more specific, the directionality of the sounds outputted from loudspeaker 1 and loudspeaker 2 is controlled, so that a sound pressure difference is made between the longitudinal direction and each of the lateral and upward directions of loudspeaker device 100. Thus, the sounds outputted from loudspeaker 1 and loudspeaker 2 can be listened to relatively easily in the longitudinal direction of loudspeaker device 100. In contrast, it is difficult to listen to the sounds outputted from loudspeaker 1 and loudspeaker 2 in the lateral direction of loudspeaker device 100 as compared with listening in the longitudinal direction. As a result, the directionality of the sound field can be controlled with a simple configuration.

Moreover, the direction in which loudspeaker 1 outputs the sound forms an angle from 60° to 120° with the direction in which loudspeaker 2 outputs the sound.

With this, when the sounds outputted from loudspeaker 1 and loudspeaker 2 are switched to the in-antiphase state, the sound fields created by loudspeaker 1 and loudspeaker 2 can effectively cancel each other out near reference plane 3.

Furthermore, loudspeaker 1 and loudspeaker 2 are placed so that one of loudspeaker 1 and loudspeaker 1 is located in the direction in which the other outputs the sound.

This achieves an overall downsizing of loudspeaker device 100.

Moreover, loudspeaker device 100 according to the present embodiment further includes input terminal 7 that receives the input sound signal. Phase control circuit 6 is capable of determining whether to output the input sound signal received from the input terminal or the inverted sound signal obtained by inverting the phase of the input sound signal. In the first switching state, the input sound signal outputted from phase control circuit 6 is inputted to loudspeaker 1 and the input sound signal from input terminal 7 is inputted to loudspeaker 2. In the second switching state, the inverted sound signal outputted from phase control circuit 6 is inputted to loudspeaker 1 and the input sound signal from input terminal 7 is inputted to loudspeaker 2.

This enables phase switching circuit 6 to easily switch between the first switching state and the second switching state.

Embodiment 2

The following describes Embodiment 2 with reference to FIG. 8A to FIG. 14B.

[2-1. Configuration of Loudspeaker Device]

Figure 8A:
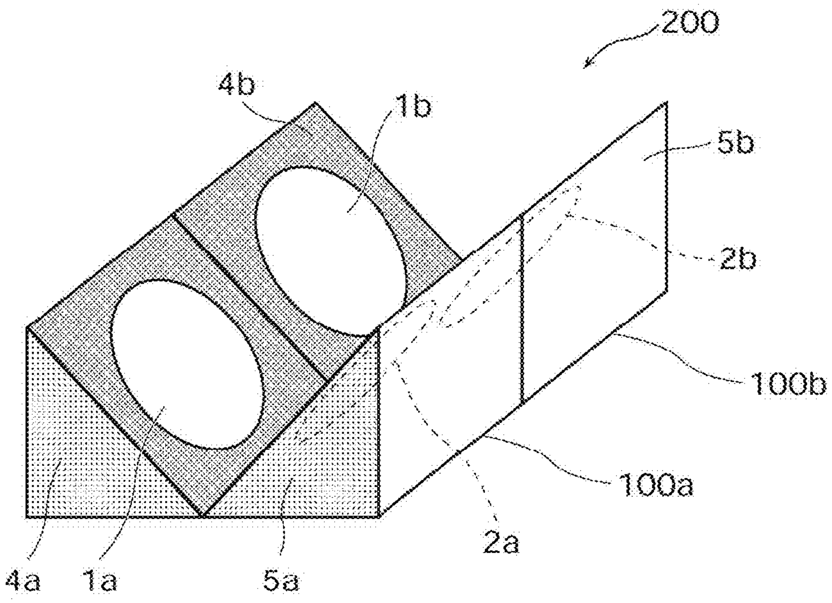
FIG. 8A is a perspective view illustrating a configuration of a loudspeaker device according to Embodiment 2.
Figure 8B:
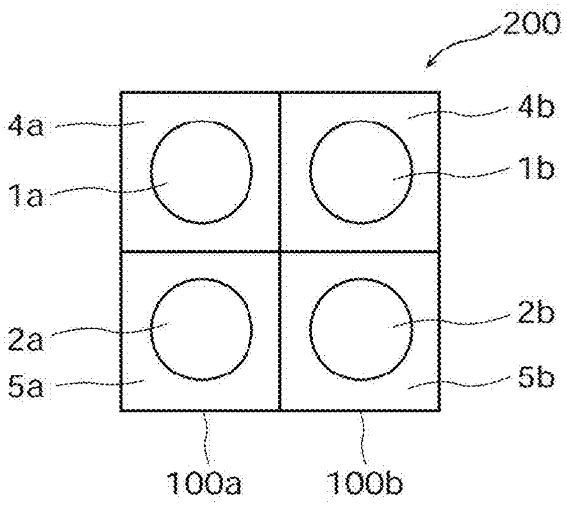
FIG. 8B is a top view illustrating the configuration of the loudspeaker device according to Embodiment 2.

A configuration of loudspeaker device 200 according to Embodiment 2 is described with reference to FIG. 8A and FIG. 8B. FIG. 8A is a perspective view illustrating the configuration of loudspeaker device 200 according to Embodiment 2. FIG. 8B is a top view illustrating the configuration of loudspeaker device 200 according to Embodiment 2. Note that components identical to those according to Embodiment 1 described above are assigned the same reference signs used in Embodiment 1 and that descriptions of these components are omitted.

Loudspeaker device 200 according to Embodiment 2 is different from loudspeaker device 100 according to Embodiment 1 in that loudspeaker device 200 includes two loudspeaker devices 100 according to Embodiment 1, the two loudspeaker devices 100 forming a line array configuration in the lateral direction. To be more specific, loudspeaker device 200 includes loudspeaker device 100*a* and loudspeaker device 100*b* as illustrated in FIG. 8A and FIG. 8B.

Each of loudspeaker device 100*a* and loudspeaker device 100*b* has the same configuration as loudspeaker device 100 according to Embodiment 1. More specifically, loudspeaker device 100*a* includes loudspeaker 1*a*, loudspeaker 2*a*, enclosure 4*a*, and enclosure 5*a*. Loudspeaker device 100*b* includes loudspeaker 1*b*, loudspeaker 2*b*, enclosure 4*b*, and enclosure 5*b*.

Loudspeaker device 200 includes: a pair of loudspeaker 1*a* and loudspeaker 2*a* in the acute-angled opposite arrangement; and a pair of loudspeaker 1*b* and loudspeaker 2*b* in the acute-angled opposite arrangement. These pairs form a line array configuration in the lateral direction. Hereinafter, loudspeaker 1*a* and loudspeaker 1*b* may be collectively referred to as "loudspeaker 1", and loudspeaker 2*a* and loudspeaker 2*b* may be collectively referred to as "loudspeaker 2".

Figure 9:
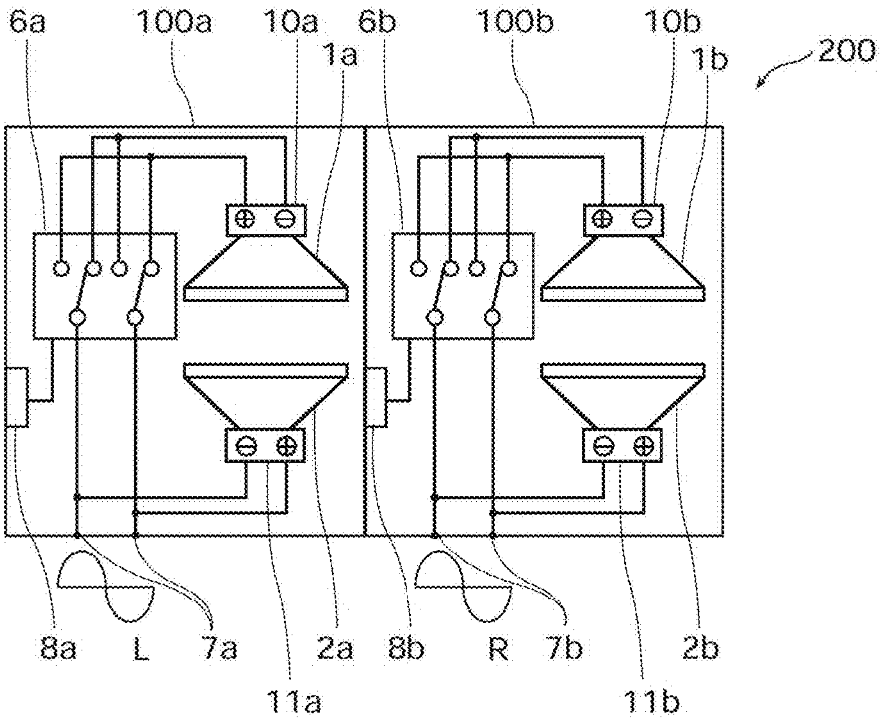
FIG. 9 is a diagram illustrating an electrical configuration of the loudspeaker device according to Embodiment 2.

Next, an electrical configuration of loudspeaker device 200 according to Embodiment 2 is described with reference to FIG. 9. FIG. 9 is a diagram illustrating the electrical configuration of loudspeaker device 200 according to Embodiment 2.

As illustrated in FIG. 9, the electrical configuration of loudspeaker device 200 also includes two loudspeaker devices 100 according to Embodiment 1. To be more specific, loudspeaker device 100*a* has the electrical configuration that includes input terminal 7*a*, phase switching circuit 6*a*, and selector switch 8*a* in addition to loudspeaker 1*a* and loudspeaker 2*a* described above. Loudspeaker device 100*b* has the electrical configuration that includes input terminal 7*b*, phase switching circuit 6*b*, and selector switch 8*b* in addition to loudspeaker 1*b* and loudspeaker 2*b* described above.

Loudspeaker 1*a* includes input terminal 10*a*. Loudspeaker 2*a* includes input terminal 11*a*. Loudspeaker 1*b* includes input terminal 10*b*. Loudspeaker 2*b* includes input terminal 11*b*. Loudspeaker 1*a* and loudspeaker 2*a* are electrically connected to be able to output sounds that are in phase or in antiphase with each other. Loudspeaker 1*b* and loudspeaker 2*b* are electrically connected to be able to output sounds that are in phase or in antiphase with each other.

Input terminal 7*a* of loudspeaker device 100*a* receives a signal of sound source L (hereinafter, referred to as "signal L"). Input terminal 7*b* of loudspeaker device 100*b* receives a signal of sound source R (hereinafter, referred to as "signal R"). For example, signal L is assigned an L-channel signal of a stereo sound source, and signal R is assigned an R-channel signal of the stereo sound source.

In the present embodiment, signal L and signal R are assigned the L-channel signal and R-channel signal of the stereo sound source, respectively. However, the signals of the stereo sound source may not necessarily be used. For example, a signal of a monaural sound source, or more specifically, the same signal may be assigned to signal L and signal R.

[2-2. Operation of Loudspeaker Device]

Next, an operation of loudspeaker device 200 according to Embodiment 2 is described.

The configuration of loudspeaker device 200 basically includes two loudspeaker devices 100 according to Embodiment 1 that form the line array configuration in the lateral direction. On this account, loudspeaker device 200 has the same sound field characteristics as loudspeaker device 100 according to Embodiment 1. The following describes a conference space as an example of a specific space in which loudspeaker device 200 is to be placed.

Figure 10A:
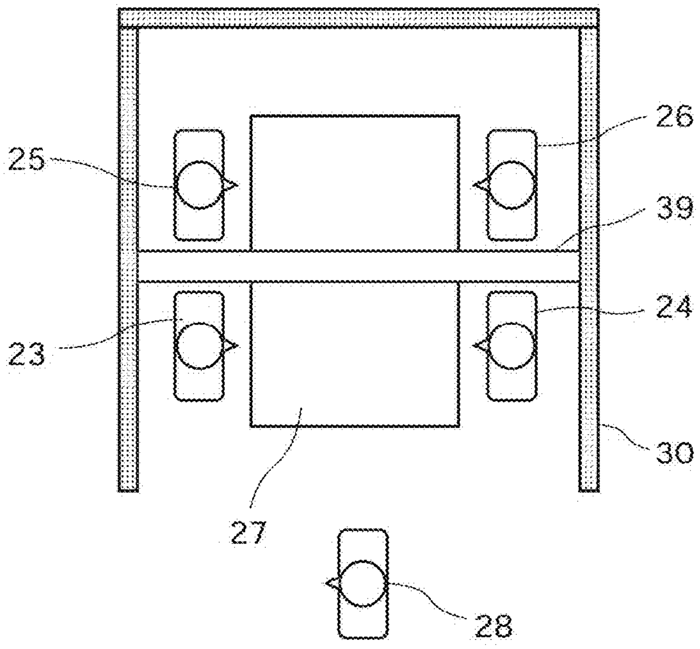
FIG. 10A is a top view illustrating an example of a space in which the loudspeaker device is to be placed, according to Embodiment 2.
Figure 10B:
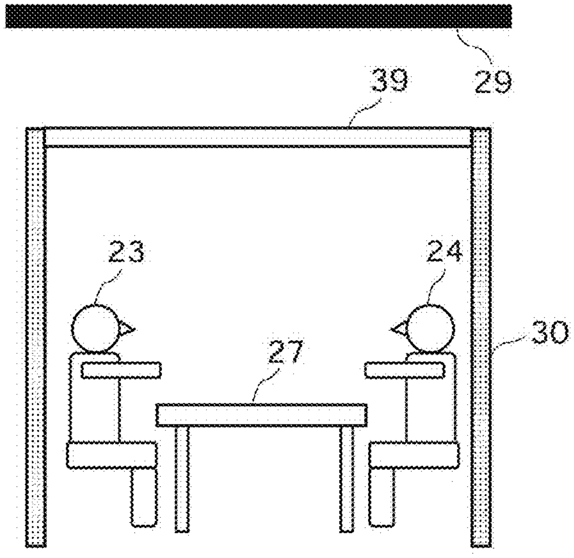
FIG. 10B is a side view illustrating the example of the space in which the loudspeaker device is to be placed, according to Embodiment 2.

The space in which loudspeaker device 200 is to be placed is described with reference to FIG. 10A and FIG. 10B. FIG. 10A is a top view illustrating an example of the space in which loudspeaker device 200 is to be placed, according to Embodiment 2. FIG. 10B is a side view illustrating the example of the space in which loudspeaker device 200 is to be placed, according to Embodiment 2.

The space in which loudspeaker device 200 is to be placed is a conference space set up in an open space, for example. As illustrated in FIG. 10A, this conference space is enclosed on three sides by partition 30 that has sound absorbability, and the remaining one side is open as an entrance. Thus, the sound propagates more easily to the outside of the conference room from the entrance that is open without partition 30, as compared with the three sides enclosed by partition 30.

Furthermore, the top of the conference space enclosed by partition 30 is not covered. Upper end parts of partition 30 are supported by a plurality of beams 39 placed at spacings. For convenience of description, FIG. 10A illustrates only one beam 39. As illustrated in FIG. 10B, space is left between partition 30 and ceiling 29. The sound easily propagates to the outside of the conference space through this space.

In this conference space, four conference participants 23, 24, 25, 26 (23 to 26) are seated at table 27 to participate in a video conference or a web conference. Outsider 28 is not participating in the video conference or the web conference held in the conference space. Outsider 28 can go down an aisle next to the entrance of partition 30 outside the conference space.

Figure 11A:
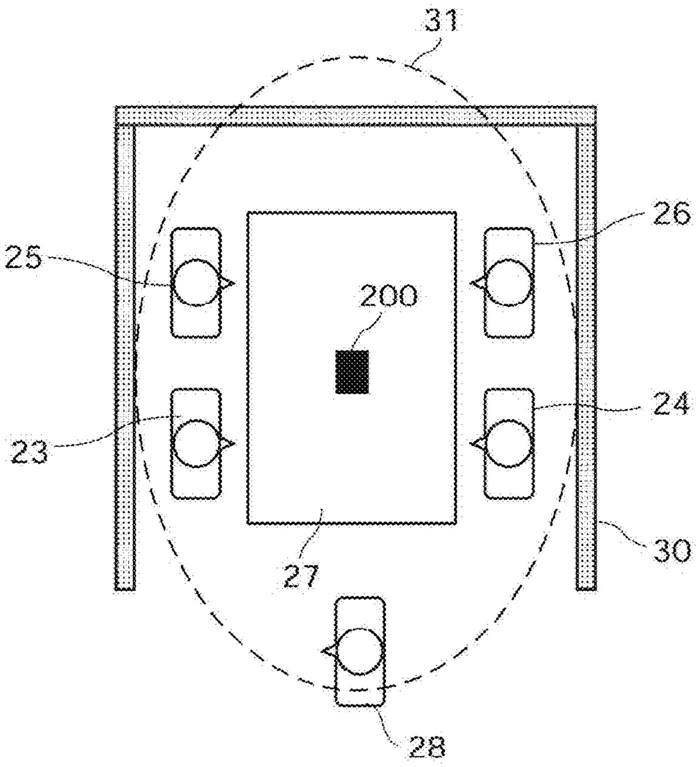
FIG. 11A is a top view illustrating sound field characteristics of the loudspeaker device that is mounted above in the in-phase state, according to Embodiment 2.
Figure 11B:
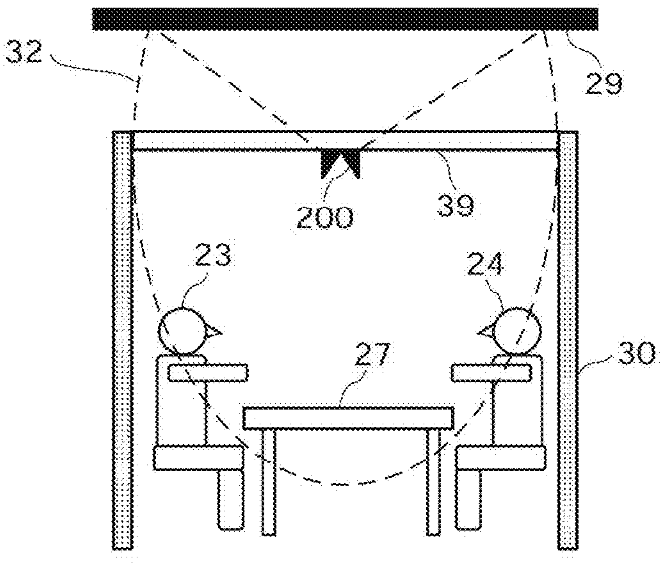
FIG. 11B is a side view illustrating the sound field characteristics of the loudspeaker device that is mounted above in the in-phase state, according to Embodiment 2.

Next, the following describes a case where loudspeaker device 200 is mounted on beam 39 in the aforementioned conference space and where both of phase switching circuits 6*a* and 6*b* (see FIG. 9) are in the in-phase state, with reference to FIG. 11A and FIG. 11B. FIG. 11A is a top view illustrating sound field characteristics of loudspeaker device 200 that is mounted above in the in-phase state, according to Embodiment 2. FIG. 11B is a side view illustrating the sound field characteristics of loudspeaker device 200 that is mounted above in the in-phase state, according to Embodiment 2. For convenience of description, an illustration of beam 39 is omitted from FIG. 11A.

As illustrated in FIG. 11A and FIG. 11B, loudspeaker device 200 is mounted on beam 39 and faces downward (that is, vertically upside down with respect to loudspeaker device 200 illustrated in FIG. 8A) from beam 39 located above the center of table 27. Moreover, loudspeaker device 200 is mounted in an orientation such that conference participants 23 to 26 are situated in the longitudinal direction of loudspeaker device 200 (that is the horizontal direction as viewed in FIG. 11A and FIG. 11B). At this time, the lateral side of loudspeaker device 200 faces the direction of the entrance of partition 30. Each of sound field curve 31 in FIG. 11A and sound field curve 32 in FIG. 11B is a contour line that connects points of equal sound pressure.

Loudspeaker device 200 is used as a conference loudspeaker that outputs sound of a remote location in a video conference or a web conference, for example. Both of phase switching circuits 6*a* and 6*b* are switched to the in-phase state. Thus, loudspeaker 1*a* and loudspeaker 2*a* of loudspeaker device 200 output sounds that are in phase with each other, and loudspeaker 1*b* and loudspeaker 2*b* of loudspeaker device 200 also output sounds that are in phase with each other.

As shown by sound field curve 31 in FIG. 11A, the sound of the conference outputted from loudspeaker device 200 reaches outsider 28 other than conference participants 23 to 26 from the entrance that is open without partition 30. Thus, outsider 28 can easily listen to the sound of the conference. Furthermore, as shown by sound field curve 32 in FIG. 11B, the sound of the conference outputted from loudspeaker device 200 propagates outside the conference space from between ceiling 29 and partition 30. Thus, the sound of the conference can possibly be listened to outside the conference space.

Figure 12A:
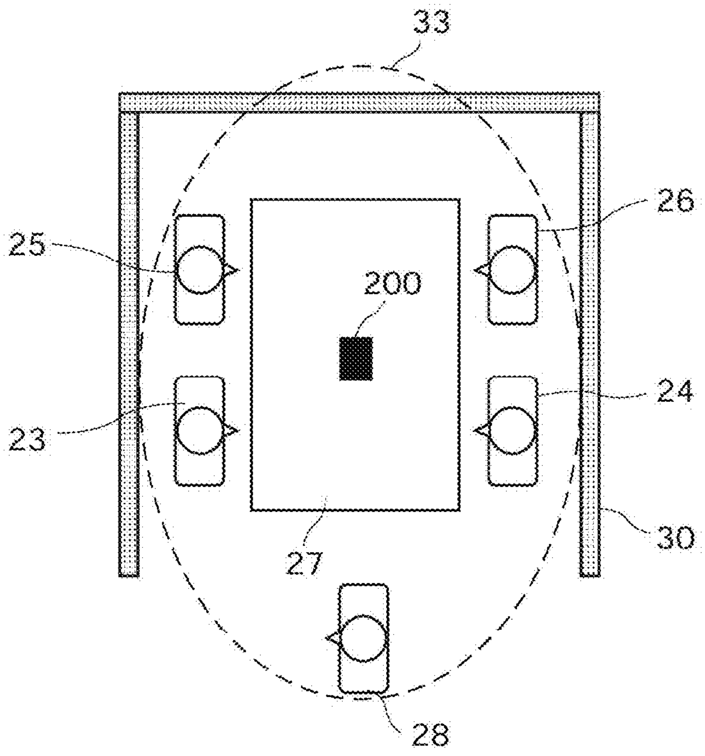
FIG. 12A is a top view illustrating sound field characteristics of the loudspeaker device that is placed on a desk in the in-phase state, according to Embodiment 2.
Figure 12B:
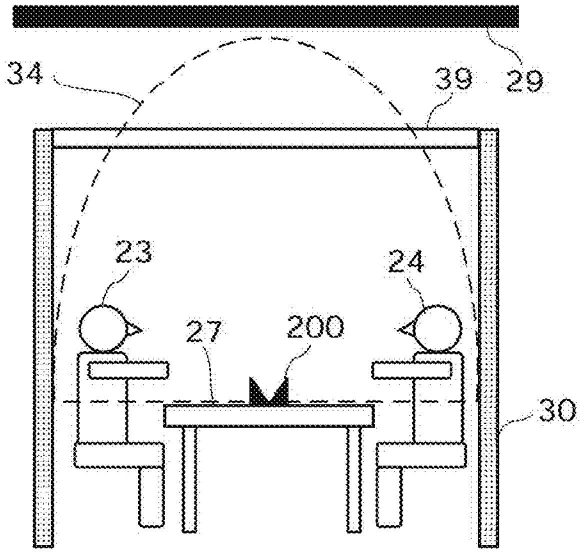
FIG. 12B is a side view illustrating the sound field characteristics of the loudspeaker device that is placed on the desk in the in-phase state, according to Embodiment 2.

Next, the following describes a case where loudspeaker device 200 is placed on a desk (table 27) in the aforementioned conference space and where both of phase switching circuits 6*a* and 6*b* are in the in-phase state, with reference to FIG. 12A and FIG. 12B. FIG. 12A is a top view illustrating sound field characteristics of loudspeaker device 200 that is placed on the desk in the in-phase state, according to Embodiment 2. FIG. 12B is a side view illustrating the sound field characteristics of the loudspeaker device that is placed on the desk in the in-phase state, according to Embodiment 2. For convenience of description, an illustration of beam 39 is omitted from FIG. 12A.

As illustrated in FIG. 12A and FIG. 12B, loudspeaker device 200 is placed in the center of table 27 to face upward (that is, the orientation of loudspeaker device 200 in FIG. 8A). Moreover, loudspeaker device 200 is placed in an orientation such that conference participants 23 to 26 are situated in the longitudinal direction of loudspeaker device 200 (that is the horizontal direction as viewed in FIG. 12A and FIG. 12B). At this time, the lateral side of loudspeaker device 200 faces the direction of the entrance of partition 30. Each of sound field curve 33 in FIG. 12A and sound field curve 34 in FIG. 12B is a contour line that connects points of equal sound pressure.

Loudspeaker device 200 is used as a conference loudspeaker that outputs sound of a remote location in a video conference or a web conference, for example, as in the case of the mounting-above in FIG. 11A and FIG. 11B. Both of phase switching circuits 6*a* and 6*b* are switched to the in-phase state. Thus, loudspeaker 1*a* and loudspeaker 2*a* of loudspeaker device 200 output sounds that are in phase with each other, and loudspeaker 1*b* and loudspeaker 2*b* of loudspeaker device 200 also output sounds that are in phase with each other.

As shown by sound field curve 33 in FIG. 12A, the sound of the conference outputted from loudspeaker device 200 reaches outsider 28 other than conference participants 23 to 26 from the entrance that is open without partition 30. Thus, outsider 28 can easily listen to the sound of the conference. Furthermore, as shown by sound field curve 34 in FIG. 12B, the sound of the conference outputted from loudspeaker device 200 propagates outside the conference space from between ceiling 29 and partition 30. Thus, the sound of the conference can possibly be listened to outside the conference space.

Figure 13A:
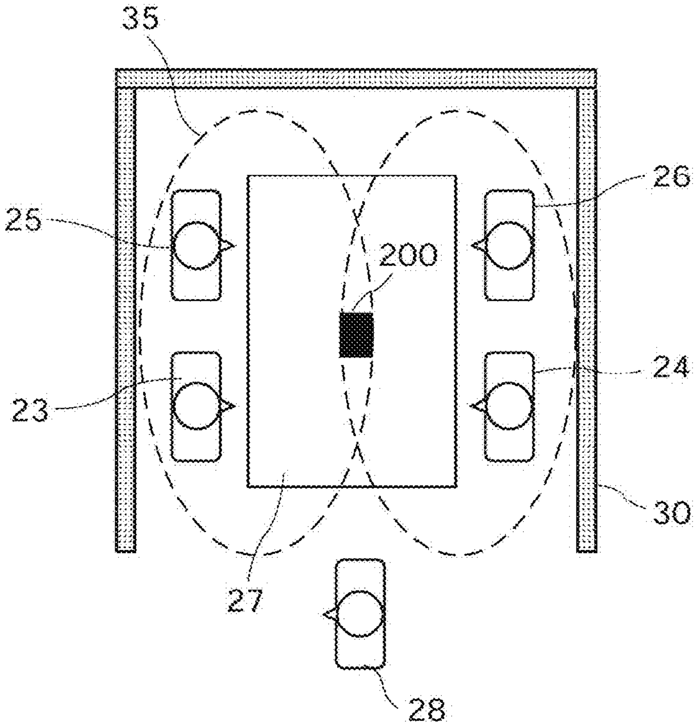
FIG. 13A is a top view illustrating sound field characteristics of the loudspeaker device that is mounted above in the in-antiphase state, according to Embodiment 2.
Figure 13B:
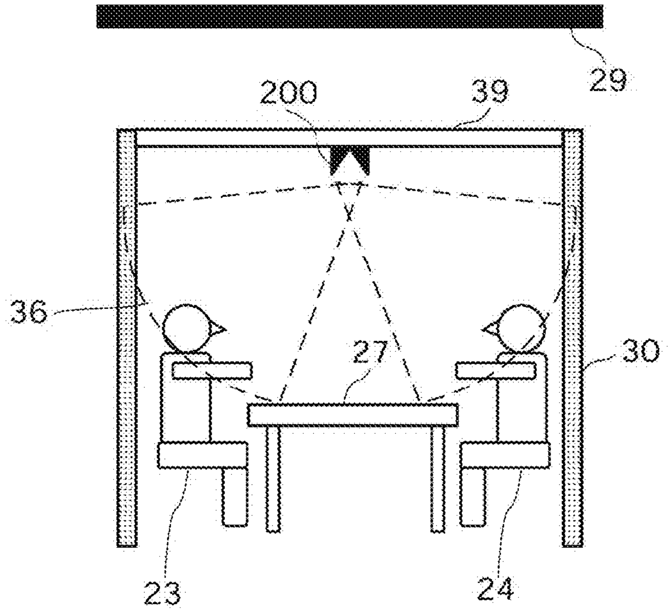
FIG. 13B is a side view illustrating the sound field characteristics of the loudspeaker device that is mounted above in the in-antiphase state, according to Embodiment 2.

Next, the following describes a case where loudspeaker device 200 is mounted on beam 39 in the aforementioned conference space and where both of phase switching circuits 6*a* and 6*b* (see FIG. 9) are in the in-antiphase state, with reference to FIG. 13A and FIG. 13B. FIG. 13A is a top view illustrating sound field characteristics of loudspeaker device 200 that is mounted above in the in-antiphase state, according to Embodiment 2. FIG. 13B is a side view illustrating the sound field characteristics of loudspeaker device 200 that is mounted above in the in-antiphase state, according to Embodiment 2. For convenience of description, an illustration of beam 39 is omitted from FIG. 13A.

As illustrated in FIG. 13A and FIG. 13B, loudspeaker device 200 is mounted on beam 39 and faces downward from beam 39 located above the center of table 27. Moreover, loudspeaker device 200 is mounted in an orientation such that conference participants 23 to 26 are situated in the longitudinal direction of loudspeaker device 200 (that is the horizontal direction as viewed in FIG. 13A and FIG. 13B). At this time, the lateral side of loudspeaker device 200 faces the direction of the entrance of partition 30. Each of sound field curve 35 in FIG. 13A and sound field curve 36 in FIG. 13B is a contour line that connects points of equal sound pressure.

Loudspeaker device 200 is used as a conference loudspeaker that outputs sound of a remote location in a video conference or a web conference, for example. Both of phase switching circuits 6*a* and 6*b* are switched to the in-antiphase state. Thus, loudspeaker 1*a* and loudspeaker 2*a* of loudspeaker device 200 output sounds that are in antiphase with each other, and loudspeaker 1*b* and loudspeaker 2*b* of loudspeaker device 200 also output sounds that are in antiphase with each other.

As illustrated in FIG. 13A, loudspeaker device 200 operates in the in-antiphase state (or more specifically, both of phase switching circuits 6*a* and 6*b* are switched to the in-antiphase state). As a result, the directionality of the sound outputted from loudspeaker device 200 is controlled as illustrated in FIG. 4, and the sound thereby has the sound field characteristics shown by sound field curve 35. Thus, conference participants 23 to 26 situated in the longitudinal direction of loudspeaker device 200 can easily listen to the sound of the conference outputted from loudspeaker device 200. However, it is difficult for outsider 28 situated lateral to loudspeaker device 200 to listen to the sound of the conference outputted from loudspeaker device 200.

As illustrated in FIG. 13B, the directionality of the sound outputted from loudspeaker device 200 is controlled as illustrated in FIG. 5, and the sound thereby has the sound field characteristics shown by sound field curve 36. This reduces the sound that propagates upward from loudspeaker device 200 (that is, propagates directly below loudspeaker device 200 mounted as illustrated in FIG. 13B). This also reduces the sound that reflects off table 27 and that thereby propagates outside the conference space from between ceiling 29 and partition 30. Thus, conference participants 23 to 26 can easily listen to the sound of the conference outputted from loudspeaker device 200. However, the sound that propagates outside the conference space from between ceiling 29 and partition 30 can be reduced.

Figure 14A:
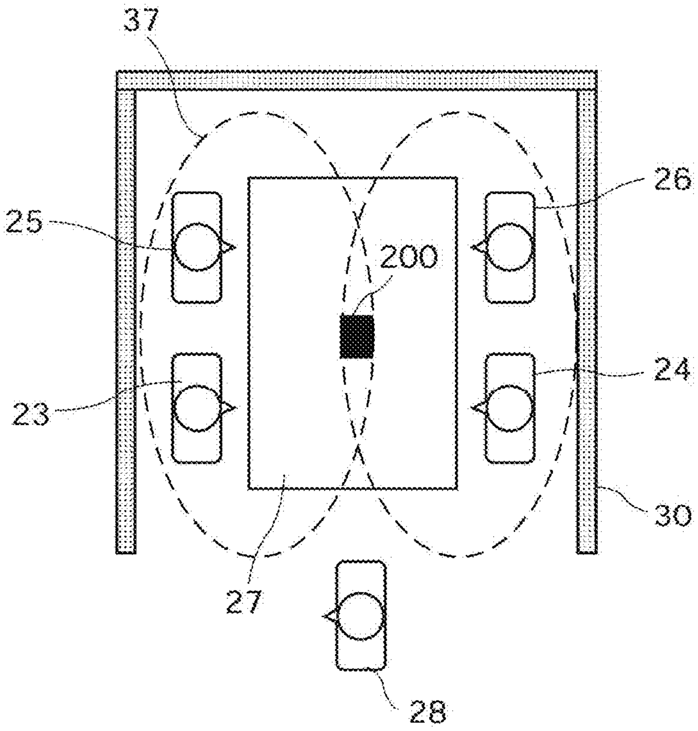
FIG. 14A is a top view illustrating sound field characteristics of the loudspeaker device that is placed on the desk in the in-antiphase state, according to Embodiment 2.
Figure 14B:
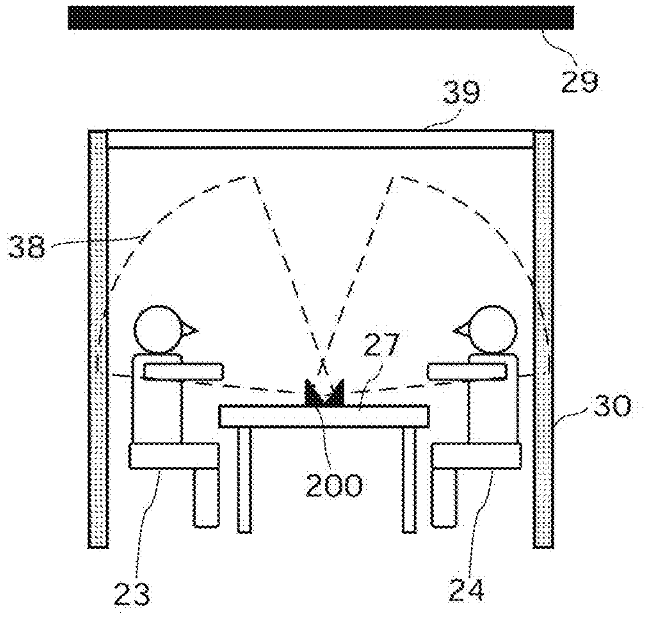
FIG. 14B is a side view illustrating the sound field characteristics of the loudspeaker device that is placed on the desk in the in-antiphase state, according to Embodiment 2.

Next, the following describes a case where loudspeaker device 200 is placed on a desk (table 27) in the aforementioned conference space and where both of switching circuits 6*a* and 6*b* are in the in-antiphase state, with reference to FIG. 14A and FIG. 14B. FIG. 14A is a top view illustrating sound field characteristics of loudspeaker device 200 that is placed on the desk in the in-antiphase state, according to Embodiment 2. FIG. 14B is a side view illustrating the sound field characteristics of loudspeaker device 200 that is placed on the desk in the in-antiphase state, according to Embodiment 2. For convenience of description, an illustration of beam 39 is omitted from FIG. 14A.

As illustrated in FIG. 14A and FIG. 14B, loudspeaker device 200 is placed in the center of table 27 to face upward. Moreover, loudspeaker device 200 is placed in an orientation such that conference participants 23 to 26 are situated in the longitudinal direction of loudspeaker device 200 (that is the horizontal direction as viewed in FIG. 14A and FIG. 14). At this time, the lateral side of loudspeaker device 200 faces the direction of the entrance of partition 30. Each of sound field curve 37 in FIG. 14A and sound field curve 38 in FIG. 14B is a contour line that connects points of equal sound pressure.

Loudspeaker device 200 is used as a conference loudspeaker that outputs sound of a remote location in a video conference or a web conference, for example. Both of phase switching circuits 6*a* and 6*b* are switched to the in-antiphase state. Thus, loudspeaker 1*a* and loudspeaker 2*a* of loudspeaker device 200 output sounds that are in antiphase with each other, and loudspeaker 1*b* and loudspeaker 2*b* of loudspeaker device 200 also output sounds that are in antiphase with each other.

As illustrated in FIG. 14A, loudspeaker device 200 operates in the in-antiphase state (or more specifically, both of phase switching circuits 6*a* and 6*b* are switched to the in-antiphase state). As a result, the directionality of the sound outputted from loudspeaker device 200 is controlled as illustrated in FIG. 4, and the sound thereby has the sound field characteristics shown by sound field curve 37. Thus, conference participants 23 to 26 situated in the longitudinal direction of loudspeaker device 200 can easily listen to the sound of the conference outputted from loudspeaker device 200. However, it is difficult for outsider 28 situated lateral to loudspeaker device 200 to listen to the sound of the conference outputted from loudspeaker device 200.

As illustrated in FIG. 14B, the directionality of the sound outputted from loudspeaker device 200 is controlled as illustrated in FIG. 5, and the sound thereby has the sound field characteristics shown by sound field curve 36. Thus, conference participants 23 to 26 can easily listen to the sound of the conference outputted from loudspeaker device 200. However, the sound that propagates outside the conference space from between ceiling 29 and partition 30 can be reduced.

As described above, to keep the sound of the conference that is outputted from loudspeaker device 200 from propagating outside the conference space in which the video conference or the web conference is held, the user simply switches both of phase switching circuits 6*a* and 6*b* to the in-antiphase state by operating selector switch 8*a* and selector switch 8*b* (see FIG. 9).

In contrast, when the user enjoys listening to music or the like in the conference space, the sound of the music outputted from loudspeaker device 200 is allowed to propagate outside the conference space. Thus, the user simply switches both of phase switching circuits 6*a* and 6*b* to the in-phase state by operating selector switch 8*a* and selector switch 8*b*.

[2-3. Advantageous Effects]

As described above, the loudspeaker device according to the present embodiment includes a plurality of pairs of loudspeaker 1 and loudspeaker 2. The plurality of pairs of loudspeaker 1 and loudspeaker 2 form a line array configuration in the lateral direction intersecting with the longitudinal direction.

In this case, the plurality of loudspeaker devices 100 according to Embodiment 1 are arranged in the line array configuration in the lateral direction. This increases the sharpness of the directional characteristics, the directional range, and the directional distance. Loudspeaker device 200 according to the present embodiment includes two loudspeaker devices 100 according to Embodiment 1 that are arranged in the line array configuration in the lateral direction. Here, the sharpness of the directional characteristics, the directional range, and the directional distance can be adjusted by changing the number of loudspeaker devices 100 to be arranged.

Furthermore, the directionality of the sound outputted from loudspeaker device 200 is controlled to make a sound pressure difference between the longitudinal direction and each of the lateral and upward directions. Such controlled directional characteristics in a frequency range from 500 Hz to 2 kHz, which is a human voice range, can make a sound pressure difference of 15 dB to 20 dB between the listening position of conference participants 23 to 26 and the listening position of outsider 28.

This reduces the sound that propagates to outsider 28 at the entrance of partition 30 and the sound that leaks from between ceiling 29 and partition 30.

Thus, in the video conference or the web conference, the sound of the conference that is outputted from loudspeaker device 200 and leaks outside the conference space can be reduced without using a headphone for example. On this account, the conference can be held without lowering the volume of loudspeaker device 200.

In general, for the loudspeaker device mounted on beam 39 to face downward from beam 39 for example, the sound outputted from the loudspeaker device diffusely reflects off a top surface of table 27. Furthermore, in such a case, audio feedback is caused by positive feedback of the sound outputted from the loudspeaker device and then received by a conference microphone placed on table 27. However, the sound pressure of the sound that propagates directly below loudspeaker device 200 (that is, propagates upward when viewed from loudspeaker device 200) according to the present embodiment is relatively low as a result of the directionality control. Thus, the sound outputted from loudspeaker device 200 is unlikely to propagate to table 27. This can reduce the sound diffusion caused by the reflection from the top surface of table 27, and also reduce the audio feedback caused by the conference microphone.

Embodiment 3

The following describes Embodiment 3 with reference to FIG. 15A to FIG. 19B.

[3-1. Configuration of Loudspeaker Device]

Figure 15A:
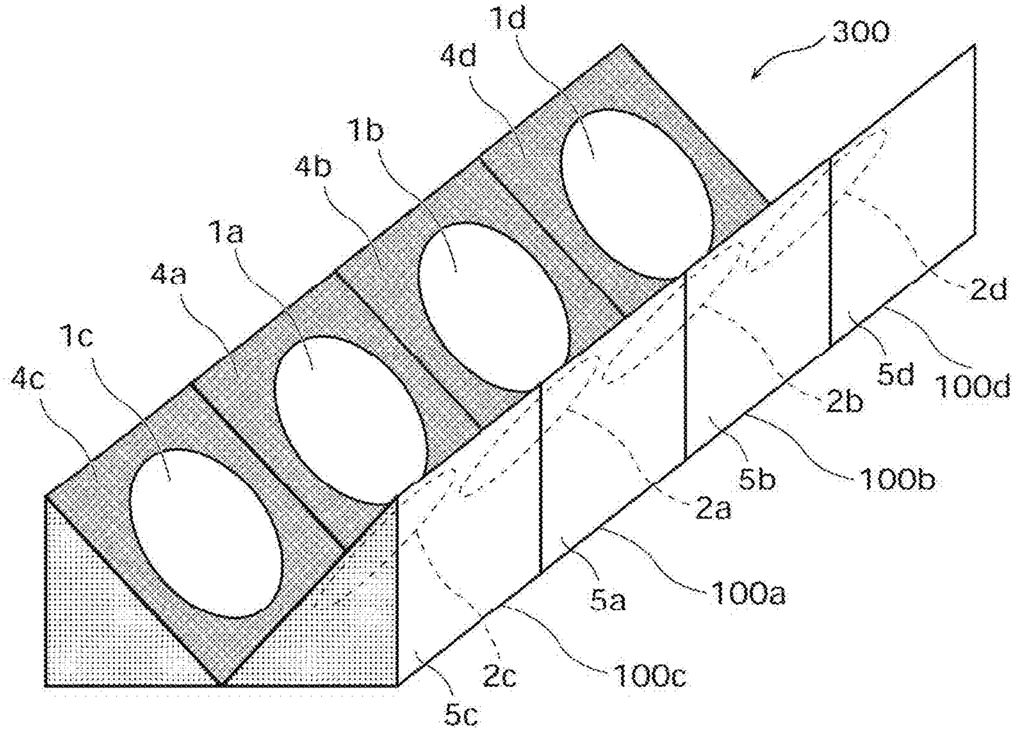
FIG. 15A is a perspective view illustrating a configuration of a loudspeaker device according to Embodiment 3.
Figure 15B:
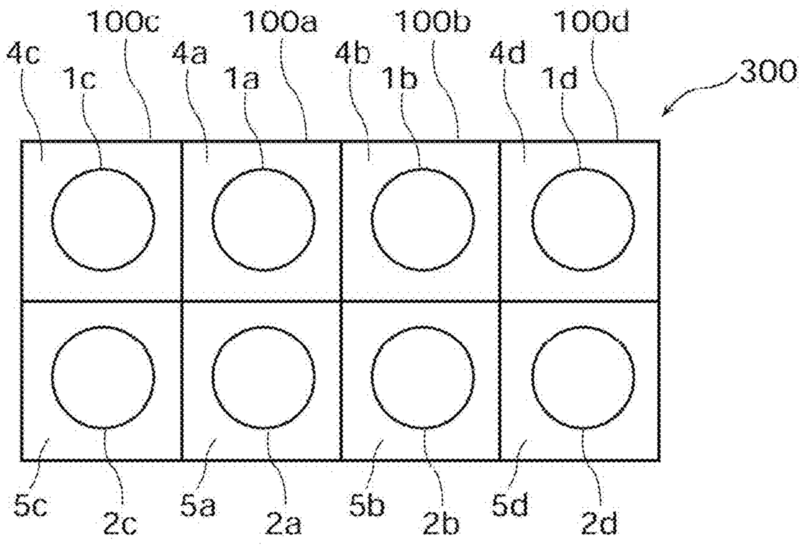
FIG. 15B is a top view illustrating the configuration of the loudspeaker device according to Embodiment 3.

A configuration of loudspeaker device 300 according to Embodiment 3 is described with reference to FIG. 15A and FIG. 15B. FIG. 15A is a perspective view illustrating the configuration of loudspeaker device 300 according to Embodiment 3. FIG. 15B is a top view illustrating the configuration of loudspeaker device 300 according to Embodiment 3.

Loudspeaker device 300 according to Embodiment 3 is different from loudspeaker device 200 according to Embodiment 2 in that loudspeaker device 300 further includes another loudspeaker device 100 according to Embodiment 1 on each side of loudspeaker device 200 according to Embodiment 2 in the lateral direction. To be more specific, loudspeaker device 300 according to Embodiment 3 includes four loudspeaker devices 100 according to Embodiment 1, the four loudspeaker devices 100 forming a line array configuration in the lateral direction.

As illustrated in FIG. 15A and FIG. 15B, loudspeaker device 300 includes loudspeaker device 100*a*, loudspeaker device 100*b*, loudspeaker device 100*c*, and loudspeaker device 100*d*. Loudspeaker device 100*a* includes loudspeaker 1*a*, loudspeaker 2*a*, enclosure 4*a*, and enclosure 5*a*. Loudspeaker device 100*b* includes loudspeaker 1*b*, loudspeaker 2*b*, enclosure 4*b*, and enclosure 5*b*. Loudspeaker device 100*c* includes loudspeaker 1*c*, loudspeaker 2*c*, enclosure 4*c*, and enclosure 5*c*. Loudspeaker device 100*d* includes loudspeaker 1*d*, loudspeaker 2*d*, enclosure 4*d*, and enclosure 5*d*.

Loudspeaker device 300 has the line array configuration that includes, in the lateral direction: a pair of loudspeaker 1*a* and loudspeaker 2*a* in the acute-angled opposite arrangement; a pair of loudspeaker 1*b* and loudspeaker 2*b* in the acute-angled opposite arrangement; a pair of loudspeaker 1*c* and loudspeaker 2*c* in the acute-angled opposite arrangement; and a pair of loudspeaker 1*d* and loudspeaker 2*d* in the acute-angled opposite arrangement. Two pairs of loudspeakers placed on both sides of loudspeaker device 300 in the lateral direction, that is, the pair of loudspeaker 1*c* and loudspeaker 2*c* and the pair of loudspeaker 1*d* and loudspeaker 2*d* are used for outputting masking sounds. Each of loudspeaker 1*a* and loudspeaker 1*b* is an example of a first loudspeaker. Each of loudspeaker 2*a* and loudspeaker 2*b* is an example of a second loudspeaker. Each of loudspeaker 1*c*, loudspeaker 2*c*, loudspeaker 1*d*, and loudspeaker 2*d* is an example of a third loudspeaker.

Figure 16:
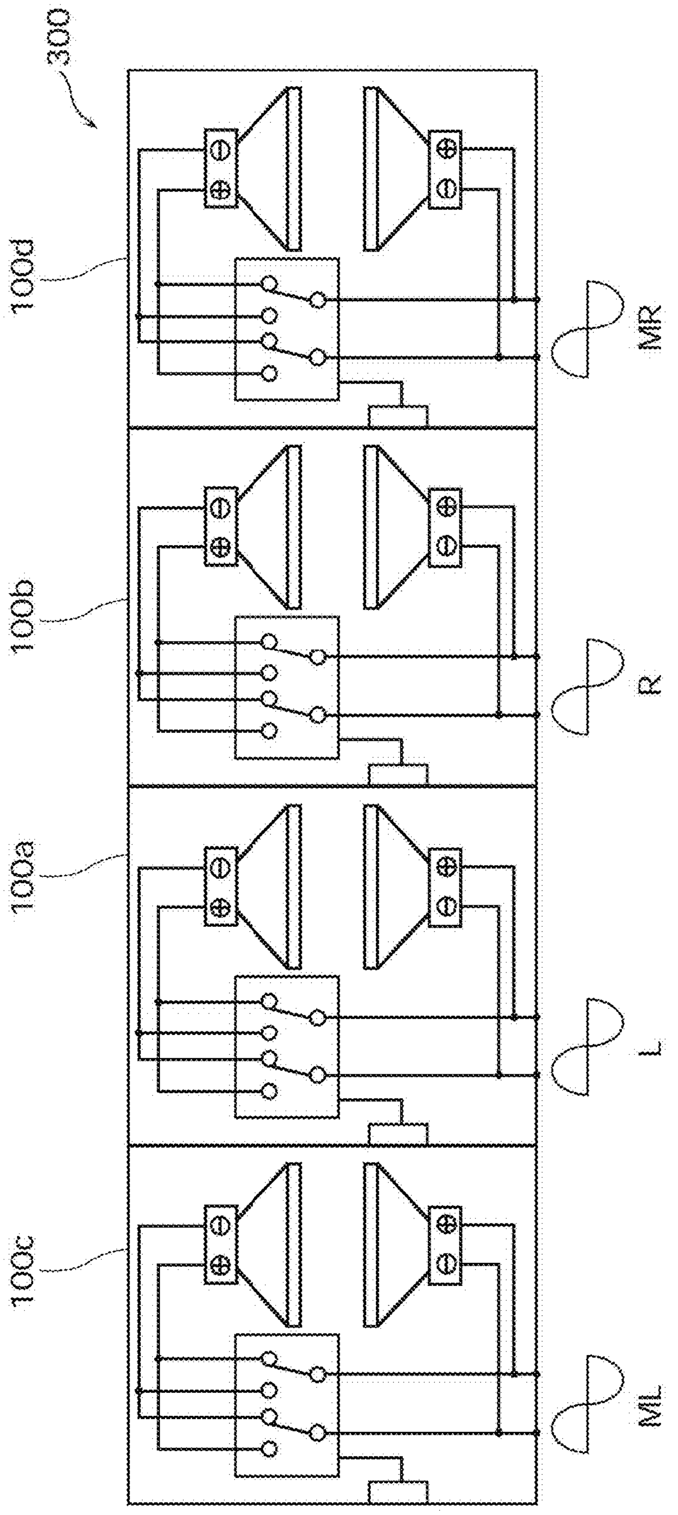
FIG. 16 is a diagram illustrating an electrical configuration of the loudspeaker device according to Embodiment 3.

Next, an electrical configuration of loudspeaker device 300 according to Embodiment 3 is described with reference to FIG. 16. FIG. 16 is a diagram illustrating the electrical configuration of loudspeaker device 300 according to Embodiment 3.

As illustrated in FIG. 16, each of four loudspeaker devices 100*a* to 100*d* has the same electrical configuration as loudspeaker device 100 according to Embodiment 1. Thus, detail descriptions are omitted here. Loudspeaker device 100*a* receives a signal of sound source L (hereinafter, this signal is referred to as "signal L"). Loudspeaker device 100*b* receives a signal of sound source R (hereinafter, this signal is referred to as "signal R"). Loudspeaker device 100*c* receives a signal of sound source ML for sound masking (hereinafter, this signal is referred to as "signal ML"). Loudspeaker device 100*d* receives a signal of sound source MR for sound masking (hereinafter, this signal is referred to as "signal MR").

Loudspeaker device 100*c* and loudspeaker device 100*d* output masking sounds based on signal ML and signal MR, respectively (hereinafter, these signals are collectively referred to as the "masking signals"). Signal L may be assigned an L-channel signal of a stereo sound source, and signal R may be assigned an R-channel signal of the stereo sound source. Signal ML and signal MR are sound signals used for outputting the masking sounds that reduce the perception of sounds outputted from loudspeaker device 100*a* and loudspeaker device 100*b*. A masking sound may be white noise or natural sound, such as sound of a brook or sound of chirping birds. Alternatively, the masking sound may include a sound in a frequency range of human voice. Signal ML and signal MR may be assigned the same sound source.

It is preferred for loudspeaker device 100c and loudspeaker device 100d to output the masking sounds at a sound pressure lower by a predetermined value than sound pressure of the sounds from loudspeaker device 100a and loudspeaker device 100b when listened to in the longitudinal direction. Here, the predetermined value is smaller than a difference between the sound pressure in the longitudinal direction and the sound pressure in the lateral direction when the sounds outputted from loudspeaker device 100a and loudspeaker device 100b are in antiphase. More specifically, it is preferred for the sound pressure of the sounds from loudspeaker device 100c and loudspeaker device 100d to be lower than the sound pressure of the sounds from loudspeaker device 100a and loudspeaker device 100b listened to at a position in the longitudinal direction with respect to loudspeaker device 100a and loudspeaker device 100b. At the same time, it is preferred for the sound pressure of the sounds from loudspeaker device 100c and loudspeaker device 100d to be set higher than the sound pressure of the sounds from loudspeaker device 100a and loudspeaker device 100b listened to at a position in the lateral direction with respect to loudspeaker device 100a and loudspeaker device 100b. Thus, it is preferred for a sound reproduction device located outside loudspeaker device 300 to input an input sound signal to each of loudspeaker device 100a and loudspeaker device 100b and also input a masking signal to each of loudspeaker device 100c and loudspeaker device 100d so that the conditions of the sound pressure described above are satisfied.

Figure 17A:
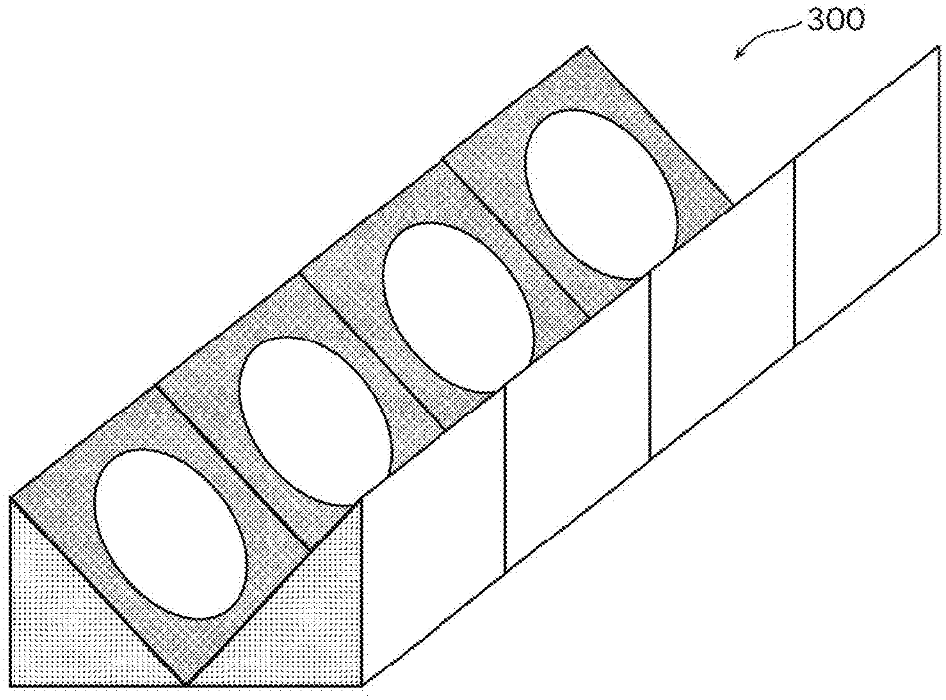
FIG. 17A is a perspective view of the loudspeaker device facing upward, according to Embodiment 3.
Figure 17B:
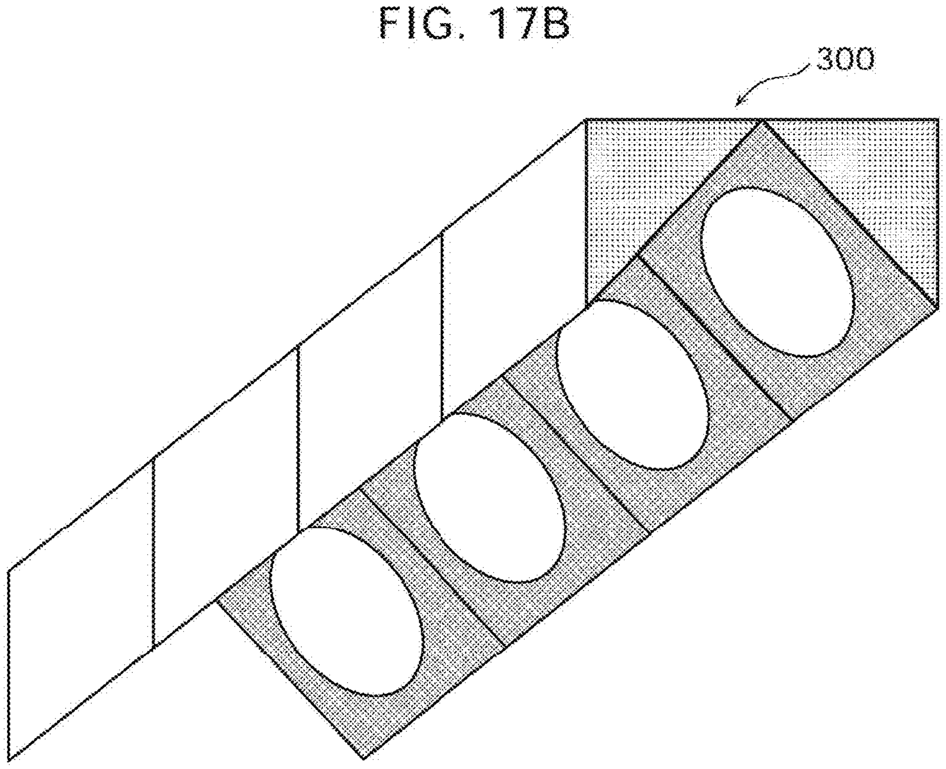
FIG. 17B is a perspective view of the loudspeaker device facing downward, according to Embodiment 3.

Next, placement of loudspeaker device 300 is described with reference to FIG. 17A and FIG. 17B. FIG. 17A is a perspective view of loudspeaker device 300 facing upward, according to Embodiment 3. FIG. 17B is a perspective view of loudspeaker device 300 facing downward, according to Embodiment 3.

To place loudspeaker device 300 on a desk, such as a table, loudspeaker device 300 is placed facing upward as illustrated in FIG. 17A. In contrast, to mount loudspeaker device 300 on a beam for instance, loudspeaker device 300 is placed facing downward as illustrated in FIG. 17B.

[3-2. Operation of Loudspeaker Device]

Next, an operation of loudspeaker device 300 according to Embodiment 3 is described.

Figure 18A:
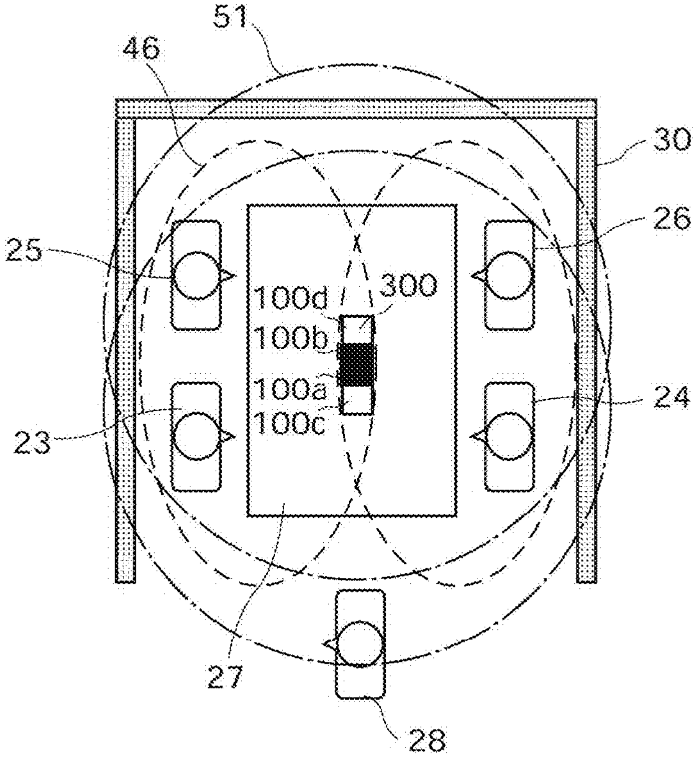
FIG. 18A is a top view illustrating sound field characteristics of the loudspeaker device mounted above, according to Embodiment 3.
Figure 18B:
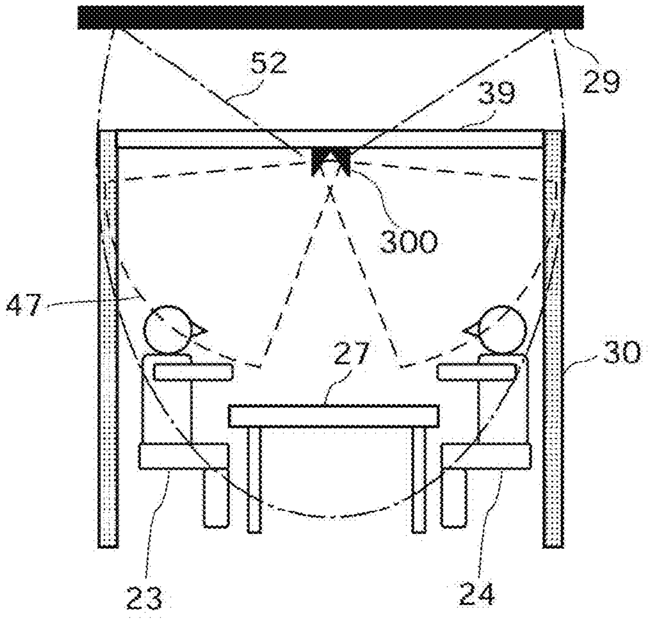
FIG. 18B is a side view illustrating the sound field characteristics of the loudspeaker device mounted above, according to Embodiment 3.

First, the following describes a case where loudspeaker device 300 is mounted above on beam 39 in the aforementioned conference space (see FIG. 10A and FIG. 10B), with reference to FIG. 18A and FIG. 18B. FIG. 18A is a top view illustrating sound field characteristics of loudspeaker device 300 mounted above, according to Embodiment 3. FIG. 18B is a side view illustrating the sound field characteristics of loudspeaker device 300 mounted above, according to Embodiment 3. For convenience of description, an illustration of beam 39 is omitted from FIG. 18A.

As illustrated in FIG. 18A and FIG. 18B, loudspeaker device 300 is mounted on beam 39 and faces downward (that is, in the orientation illustrated in FIG. 17B) from beam 39 located above the center of table 27. Moreover, loudspeaker device 300 is mounted in an orientation such that conference participants 23 to 26 are situated in the longitudinal direction of loudspeaker device 300 (that is the horizontal direction as viewed in FIG. 18A and FIG. 18B). At this time, the lateral side of loudspeaker device 300 faces the direction of the entrance of partition 30. Sound field curve 46 indicated by a broken line in FIG. 18A and sound field curve 47 indicated by a broken line in FIG. 18B are contour lines that connect points of equal sound pressure of the sounds outputted from loudspeaker device 100a and loudspeaker device 100b. Sound field curve 51 indicated by a dashed-dotted line in FIG. 18A and sound field curve 52 indicated by a dashed-dotted line in FIG. 18B are contour lines that connect points of equal sound pressure of the masking sounds outputted from loudspeaker device 100c and loudspeaker device 100d.

Two loudspeaker devices 100a and 100b positioned at the middle of loudspeaker device 300 are used as conference loudspeakers that output sounds of a remote location (sounds of a conference) in a video conference or a web conference, for example. Loudspeaker 1a and loudspeaker 2a of loudspeaker device 100a output sounds that are in antiphase with each other. Loudspeaker 1b and loudspeaker 2b of loudspeaker device 100b also output sounds that are in antiphase with each other.

On the other hand, two loudspeaker devices 100c and 100d positioned at both sides of loudspeaker device 300 output the masking sounds that are in phase with each other. Thus, loudspeaker device 100c and loudspeaker device 100d generate a wide sound field of the masking sounds around loudspeaker device 300.

As illustrated in FIG. 18A, loudspeaker device 100a and loudspeaker device 100b used as the conference loudspeakers of loudspeaker device 300 operate in the in-antiphase state. The directionality of the sounds outputted from loudspeaker device 100a and loudspeaker device 100b is controlled as illustrated in FIG. 4, and the sounds thereby have the sound field characteristics shown by sound field curve 46. Thus, conference participants 23 to 26 situated in the longitudinal direction of loudspeaker device 300 (loudspeaker device 100a and loudspeaker device 100b) can easily listen to the sounds of the conference outputted from loudspeaker device 100a and loudspeaker device 100b. However, it is difficult for outsider 28 situated lateral to loudspeaker device 300 to listen to the sounds of the conference outputted from loudspeaker device 100a and loudspeaker device 100b.

As illustrated in FIG. 18B, the directionality of the sounds outputted from loudspeaker device 100a and loudspeaker device 100b is controlled as illustrated in FIG. 5, and the sounds thereby have the sound field characteristics shown by sound field curve 47. Thus, conference participants 23 to 26 can easily listen to the sounds of the conference outputted from loudspeaker device 100a and loudspeaker device 100b. However, the sound that propagates outside the conference space from between ceiling 29 and partition 30 can be reduced.

Loudspeaker device 100c and loudspeaker device 100d of loudspeaker device 300 that output the masking sounds operate in the in-phase state. The directionality of the sounds outputted from loudspeaker device 100c and loudspeaker device 100d is controlled as illustrated in FIG. 6 and FIG. 7, and the sounds thereby have the sound field characteristics shown by sound field curve 51 and sound field curve 52. The masking sounds, which are in phase and have wide directionality, propagate outside partition 30. Thus, not only conference participants 23 to 26 but also outsider 28 can listen to the masking sounds.

Figure 19A:
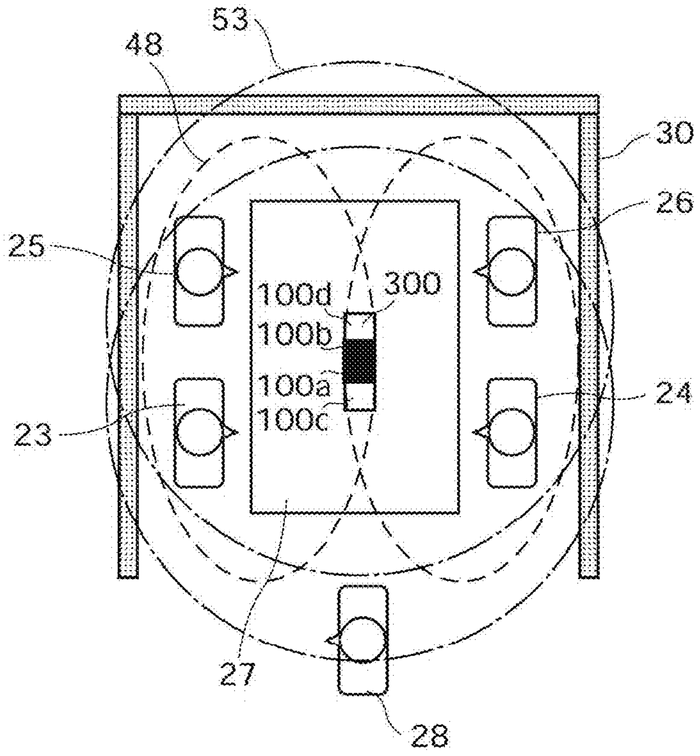
FIG. 19A is a top view illustrating sound field characteristics of the loudspeaker device placed on a desk, according to Embodiment 3.
Figure 19B:
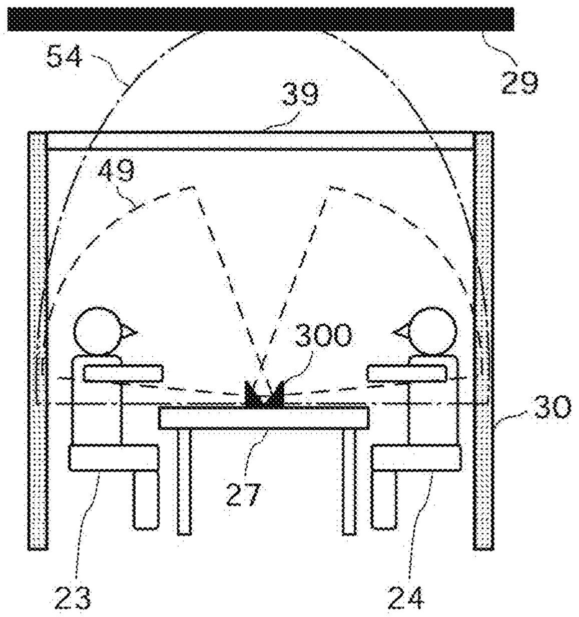
FIG. 19B is a side view illustrating the sound field characteristics of the loudspeaker device placed on the desk, according to Embodiment 3.

Next, the following describes a case where loudspeaker device 300 is placed on a desk (table 27) in the aforementioned conference space, with reference to FIG. 19A and FIG. 19B. FIG. 19A is a top view illustrating sound field characteristics of loudspeaker device 300 placed on the desk, according to Embodiment 3. FIG. 19B is a side view illustrating the sound field characteristics of loudspeaker device 300 placed on the desk, according to Embodiment 3.

Sound field curve 48 indicated by a broken line in FIG. 19A and sound field curve 49 indicated by a broken line in FIG. 19B are contour lines that connect points of equal sound pressure of the sounds outputted from loudspeaker device 100*a* and loudspeaker device 100*b*. Sound field curve 53 indicated by a dashed-dotted line in FIG. 19A and sound field curve 54 indicated by a dashed-dotted line in FIG. 19B are contour lines that connect points of equal sound pressure of the masking sounds outputted from loudspeaker device 100*c* and loudspeaker device 100*d*.

Two loudspeaker devices 100*a* and 100*b* positioned at the middle of loudspeaker device 300 are used as conference loudspeakers that output sounds of a remote location (sounds of a conference) in a video conference or a web conference, for example. Loudspeaker 1*a* and loudspeaker 2*a* of loudspeaker device 100*a* output sounds that are in antiphase with each other. Loudspeaker 1*b* and loudspeaker 2*b* of loudspeaker device 100*b* also output sounds that are in antiphase with each other. On the other hand, two loudspeaker devices 100*c* and 100*d* positioned at both sides of loudspeaker device 300 output the masking sounds that are in phase with each other. Thus, loudspeaker device 100*c* and loudspeaker device 100*d* generate a wide sound field of the masking sounds around loudspeaker device 300.

As illustrated in FIG. 19A, loudspeaker device 100*a* and loudspeaker device 100*b* used as the conference loudspeakers of loudspeaker device 300 operate in the in-antiphase state. The directionality of the sounds outputted from loudspeaker device 100*a* and loudspeaker device 100*b* is controlled as illustrated in FIG. 4, and the sounds thereby have the sound field characteristics shown by sound field curve 48. Thus, conference participants 23 to 26 situated in the longitudinal direction of loudspeaker device 300 (loudspeaker device 100*a* and loudspeaker device 100*b*) can easily listen to the sounds of the conference outputted from loudspeaker device 100*a* and loudspeaker device 100*b*. However, it is difficult for outsider 28 situated lateral to loudspeaker device 300 to listen to the sounds of the conference outputted from loudspeaker device 100*a* and loudspeaker device 100*b*.

As illustrated in FIG. 19B, the directionality of the sounds outputted from loudspeaker device 100*a* and loudspeaker device 100*b* is controlled as illustrated in FIG. 5, and the sounds thereby have the sound field characteristics shown by sound field curve 49. Thus, conference participants 23 to 26 can easily listen to the sounds of the conference outputted from loudspeaker device 100*a* and loudspeaker device 100*b*. However, the sound that propagates outside the conference space from between ceiling 29 and partition 30 can be reduced.

Loudspeaker device 100*c* and loudspeaker device 100*d* of loudspeaker device 300 that output the masking sounds operate in the in-phase state. The directionality of the sounds outputted from loudspeaker device 100*c* and loudspeaker device 100*d* is controlled as illustrated in FIG. 6 and FIG. 7, and the sounds thereby have the sound field characteristics shown by sound field curve 53 and sound field curve 54. The masking sounds, which are in phase and have wide directionality, propagate outside partition 30. Thus, not only conference participants 23 to 26 but also outsider 28 can listen to the masking sounds.

Thus, the masking sounds outputted from loudspeaker device 100*c* and loudspeaker device 100*d* as well as the sounds of the conference outputted from loudspeaker device 100*a* and loudspeaker device 100*b* propagate in the longitudinal direction of loudspeaker device 300. On this account, conference participants 23 to 26 can listen to the masking sounds as well as the sounds of the conference. The sound pressure of the sounds of the conference is higher in the longitudinal direction than in the lateral direction of loudspeaker device 300. For this reason, the sounds of the conference are less likely to be masked by the masking sounds in the longitudinal direction than in the lateral direction of loudspeaker device 300.

In contrast, the sound pressure of the sounds of the conference that propagate in the lateral direction of loudspeaker device 300 is lower than the sound pressure in the longitudinal direction. Thus, it is difficult for outsider 28 to listen to the sounds of the conference. Furthermore, although the masking sounds propagate in the longitudinal and lateral directions of loudspeaker device 300 at the same sound pressure, the sound pressure of the sounds of the conference is lower in the lateral direction than in the longitudinal direction. For this reason, the sounds of the conference are more likely to be masked by the masking sounds in the lateral direction than in the longitudinal direction. This enables loudspeaker device 300, which outputs the masking sounds, to further increase a difference in intelligibility of the sounds of the conference depending on a listening position.

Furthermore, it is preferred for the sound pressure of the masking sounds from loudspeaker device 100*c* and loudspeaker device 100*d* to be lower than the sound pressure of the sounds of the conference from loudspeaker device 100*a* and loudspeaker device 100*b* listened to at a position in the longitudinal direction with respect to loudspeaker device 100*a* and loudspeaker device 100*b*. At the same time, it is preferred for the sound pressure of the masking sounds from loudspeaker device 100*c* and loudspeaker device 100*d* to be set higher than the sound pressure of the sounds of the conference from loudspeaker device 100*a* and loudspeaker device 100*b* listened to at a position in the lateral direction with respect to loudspeaker device 100*a* and loudspeaker device 100*b*. In this case, conference participants 23 to 26 situated in the longitudinal direction of loudspeaker device 300 listen to the sounds of the conference outputted from loudspeaker device 100*a* and loudspeaker device 100*b* at the sound pressure higher than that of the masking sounds outputted from loudspeaker device 100*c* and loudspeaker device 100*d*. Thus, conference participants 23 to 26 can listen to the sounds of the conference relatively clearly. In contrast, outsider 28 situated lateral to loudspeaker device 300 listens to the sounds of the conference outputted from loudspeaker device 100*a* and loudspeaker device 100*b* at the sound pressure lower than that in the longitudinal direction and also listens to the masking sounds outputted from loudspeaker device 100*c* and loudspeaker device 100*d* at the sound pressure higher than that of the sounds of the conference. Thus, it is more difficult for outsider 28 to listen to the sounds of the conference.

As described above, loudspeaker device 300 used as the conference loudspeaker according to the present embodiment is mounted on beam 39 to face downward from beam 39 located above the center of table 27, or is placed in the center of table 27 to face upward. Loudspeaker device 100*a* and loudspeaker device 100*b* output the directionality-controlled sounds of the conference within the conference space. Loudspeaker device 100*c* and loudspeaker device 100*d* output the masking sounds in all directions around the conference space.

Four conference participants 23 to 26 sit at table 27 in the longitudinal direction of loudspeaker device 300. Outsider

28 can pass by the entrance that is open without partition 30, or more specifically, can pass by the lateral side of loudspeaker device 300. In these circumstances, the directionality control over the sound in the human voice range from 500 Hz to 2 kHz makes a sound pressure difference of 15 dB to 20 dB between the listening position of conference participants 23 to 26 and the listening position of outsider 28.

Furthermore, loudspeaker device 100*c* and loudspeaker device 100*d* are positioned next to loudspeaker device 100*a* and loudspeaker device 100*b*, respectively, in the longitudinal direction. Then, loudspeaker device 100*c* and loudspeaker device 100*d* output the masking sounds. Loudspeaker device 100*c* and loudspeaker device 100*d* output the in-phase masking sounds, which are environmental sounds, such as natural sounds. The sound pressure of the masking sounds is lower by 10 dB to 15 dB than that of the sounds outputted from loudspeakers 1 and loudspeakers 2 included in loudspeaker device 100*a* and loudspeaker device 100*b*. As a result, outside the conference space, the sound pressure of the sounds of the conference outputted from loudspeaker device 100*a* and loudspeaker device 100*b* is lower than the sound pressure of the masking sounds outputted from loudspeaker device 100*c* and loudspeaker device 100*d*.

This can reduce propagation of the sounds of the conference from the entrance of partition 30 to outsider 28 other than conference participants 23 to 26. This can also reduce leakage of the sounds of the conference from between ceiling 29 and partition 30 to outside the conference space.

Hence, loudspeaker device 300 according to the present embodiment allows conference participants 23 to 26 to have the conference without using headphones for example or without lowering the volume of the loudspeaker to avoid leakage of the sounds of the conference to the outside of the conference space.

[3-3. Advantageous Effects]

As described above, loudspeaker device 300 according to the present embodiment further includes loudspeaker 1*c*, loudspeaker 1*d*, loudspeaker 2*c*, and loudspeaker 2*d* that are adjacent to loudspeaker 1*a*, loudspeaker 1*b*, loudspeaker 2*a*, and loudspeaker 2*b* in the lateral direction intersecting with the longitudinal direction. Loudspeaker 1*c*, loudspeaker 1*d*, loudspeaker 2*c*, and loudspeaker 2*d* output the sounds based on the masking signals different from the loudspeaker input signals (the input sound signals or the inverted sound signals).

With this, the masking sounds are outputted in the longitudinal and lateral directions of loudspeaker device 300. Thus, the sounds outputted from loudspeaker 1*a*, loudspeaker 1*b*, loudspeaker 2*a*, and loudspeaker 2*b* can be listened to in the longitudinal direction of loudspeaker device 300. However, it is more difficult for these sounds to be listened to in the lateral direction of loudspeaker device 300.

[3-4. Advantageous Effects of Line Array Configuration]

Here, advantageous effects achieved by an arrangement of a plurality of loudspeaker devices in a line array in the lateral direction (hereinafter, this arrangement is referred to as the line array configuration) are described with reference to FIG. 20 to FIG. 22. Each of FIG. 20 to FIG. 22 is a diagram illustrating an effect achieved by the line array configuration including a plurality of loudspeaker devices.

Figure 20:
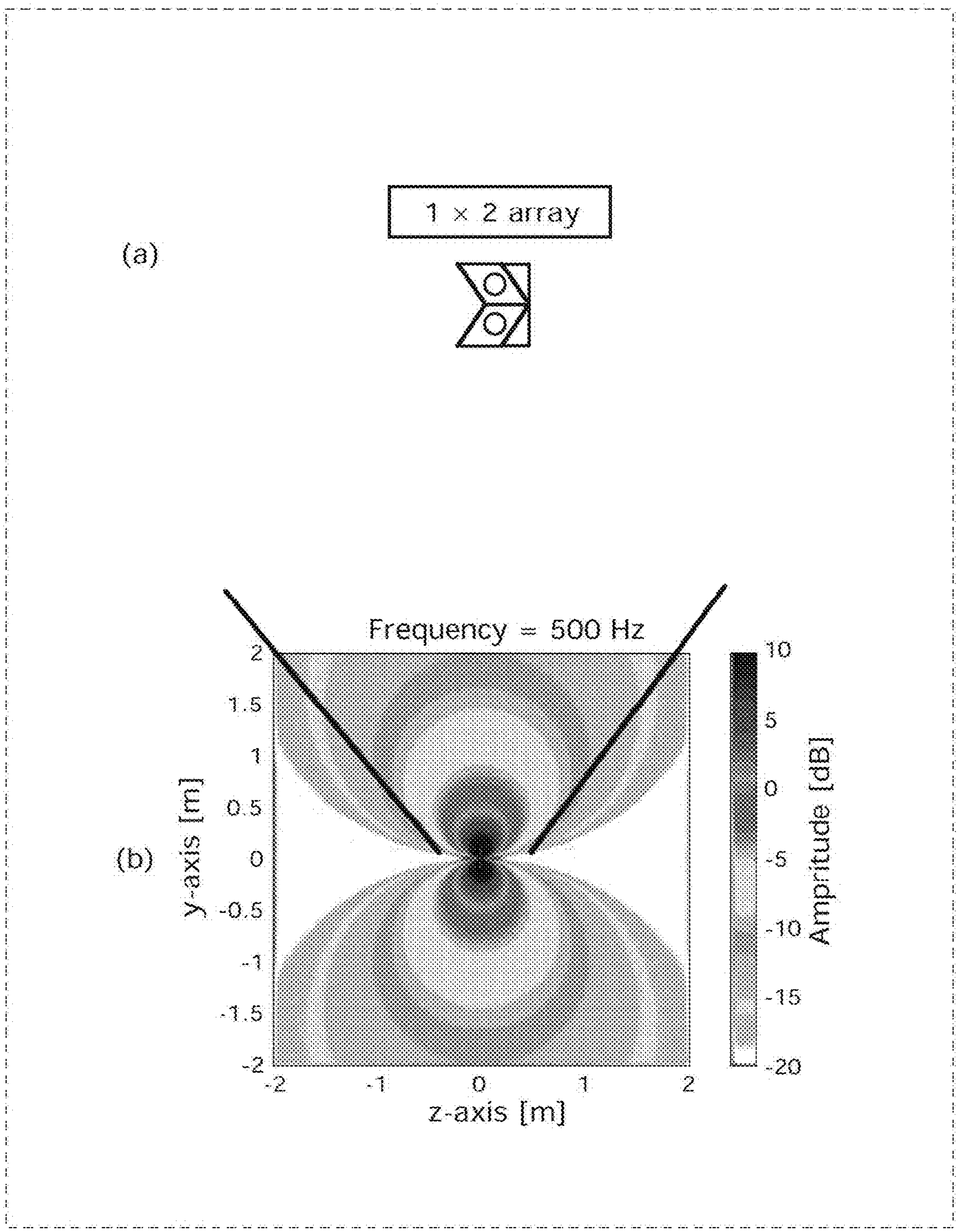
FIG. 20 is a diagram illustrating an effect obtained by a line array configuration of a plurality of loudspeaker devices.

As illustrated in (a) of FIG. 20, one loudspeaker device (including one pair of loudspeakers arranged in a 1-by-2 array) was used to measure directional characteristics of sound outputted from this loudspeaker device. The frequency of the sound outputted from the loudspeaker device was 500 Hz. The result of measuring the directional characteristics of the sound is shown in (b) of FIG. 20.

Figure 21:
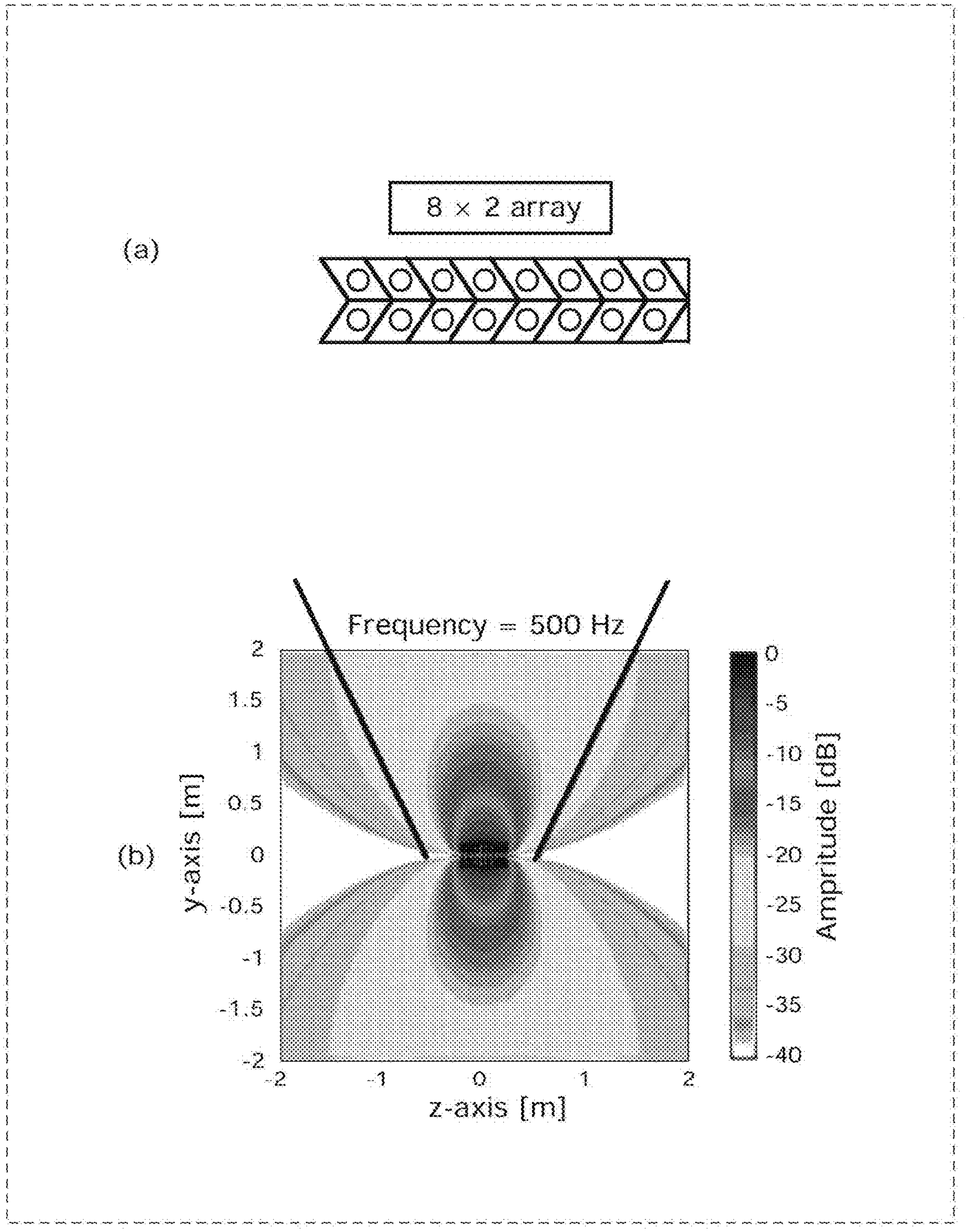
FIG. 21 is a diagram illustrating an effect obtained by a line array configuration of a plurality of loudspeaker devices.

Furthermore, as illustrated in (a) of FIG. 21, eight loudspeaker devices (including eight pairs of loudspeakers arranged in an 8-by-2 array) were used to measure directional characteristics of sound outputted from the eight loudspeaker devices. The frequency of the sound outputted from the eight loudspeaker devices was 500 Hz. The result of measuring the directional characteristics of the sound is shown in (b) of FIG. 21.

Figure 22:
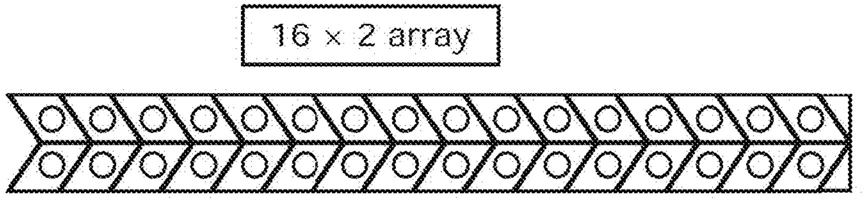
FIG. 22 is a diagram illustrating an effect obtained by a line array configuration of a plurality of loudspeaker devices.
Figure 22:
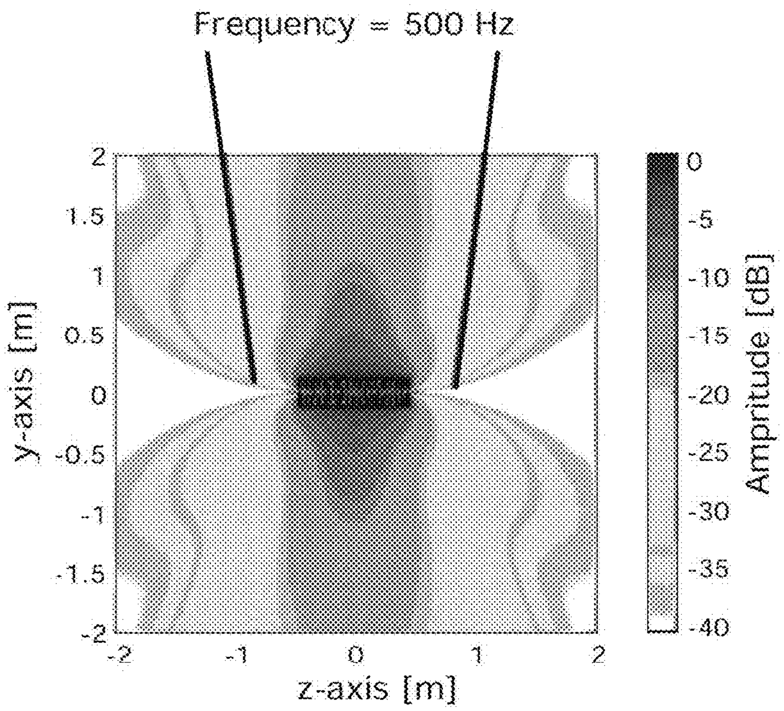

Furthermore, as illustrated in (a) of FIG. 22, 16 loudspeaker devices (including 16 pairs of loudspeakers arranged in a 16-by-2 array) were used to measure directional characteristics of sound outputted from the 16 loudspeaker devices. The frequency of the sound outputted from the 16 loudspeaker devices was 500 Hz. The result of measuring the directional characteristics of the sound is shown in (b) of FIG. 22.

Two solid lines in (b) of FIG. 20, (b) of FIG. 21, and (b) of FIG. 22 show the sharpness of the directional characteristics of the sound. As shown, the sharpness of the directional characteristics increases (that is, the directionality grows narrowed) as the two solid lines become parallel to each other.

As shown, (b) of FIG. 20, (b) of FIG. 21, and (b) of FIG. 22 reveal that the plurality of loudspeaker devices in the line array configuration have the narrowed range on the wider side of the sound pressure and the increased sharpness of the sound directionality characteristics, as compared with the single loudspeaker device without a line array configuration.

Moreover, (b) of FIG. 21 and (b) of FIG. 22 reveal that the wider side of the sound pressure becomes further narrowed and the sharpness of the directionality characteristics further increases with the number of the plurality of loudspeaker devices in the line array configuration.

Embodiment 4

[4-1. Configuration of Loudspeaker Device]

Figure 23:
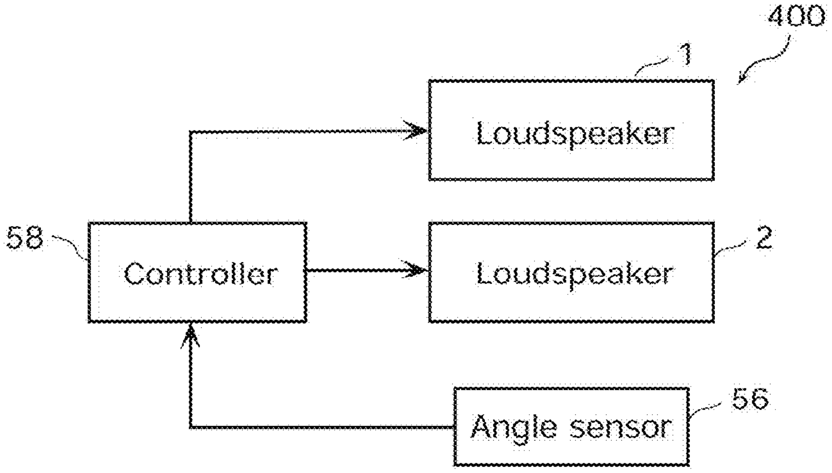
FIG. 23 is a block diagram illustrating a configuration of a loudspeaker device according to Embodiment 4.
Figure 24:
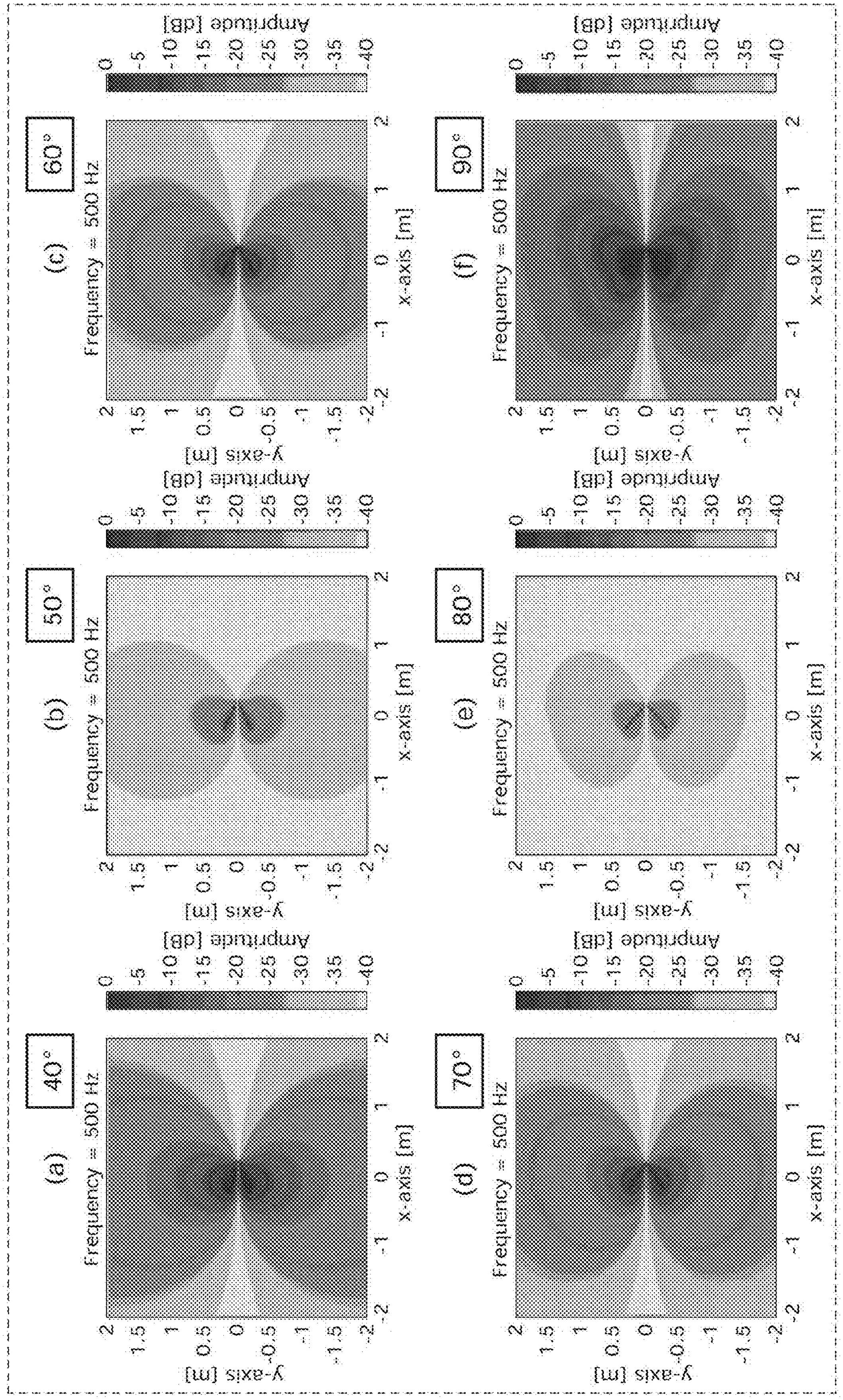
FIG. 24 is a diagram illustrating directional characteristics of sound outputted from the loudspeaker device according to Embodiment 4.
Figure 25:
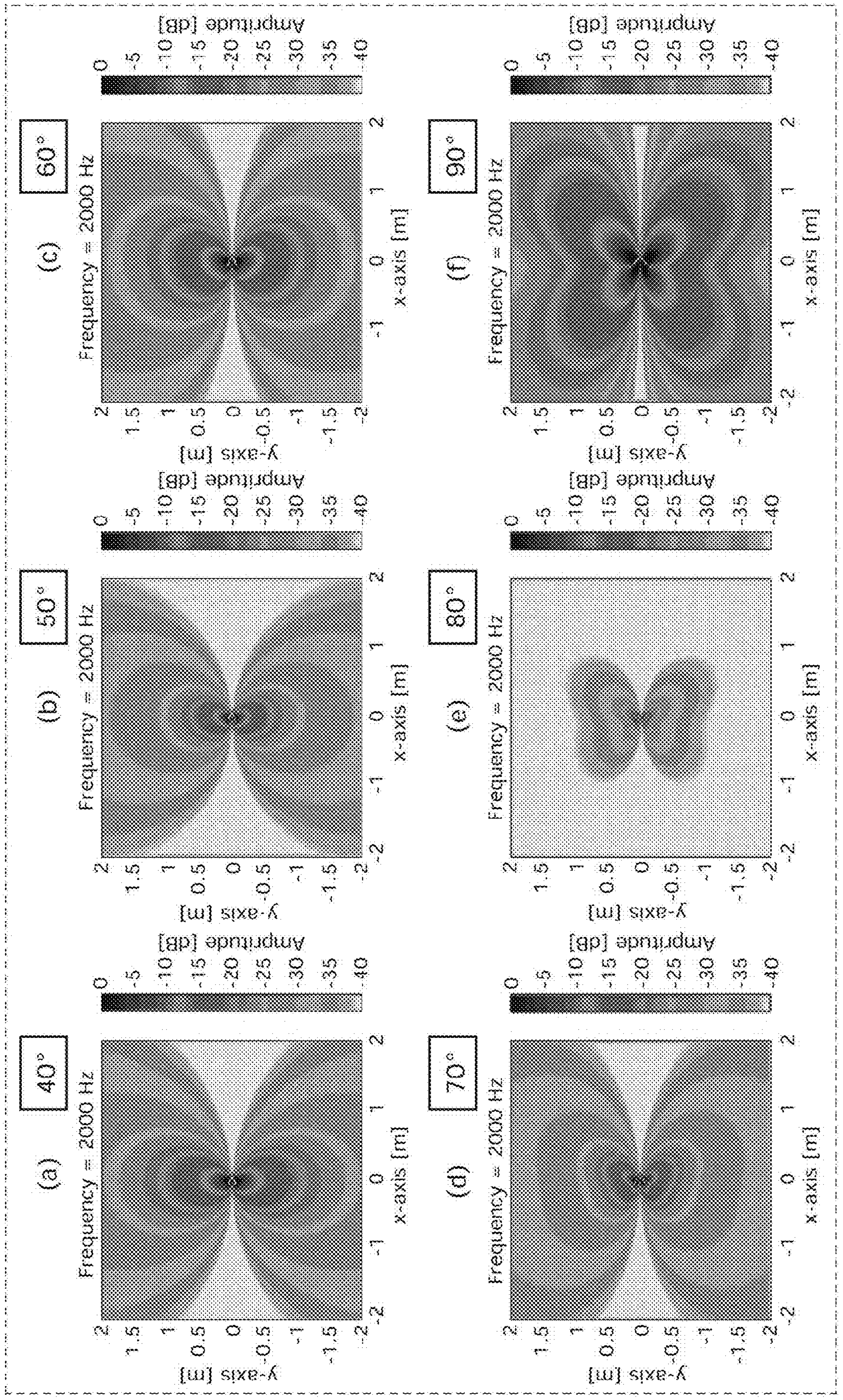
FIG. 25 is a diagram illustrating directional characteristics of sound outputted from the loudspeaker device according to Embodiment 4.

A configuration of loudspeaker device 400 according to Embodiment 4 is described with reference to FIG. 23 to FIG. 25. FIG. 23 is a block diagram illustrating the configuration of loudspeaker device 400 according to Embodiment 4. Each of FIG. 24 and FIG. 25 is a diagram illustrating directional characteristics of a sound outputted from loudspeaker device 400 according to Embodiment 4.

As illustrated in FIG. 23, loudspeaker device 400 according to Embodiment 4 includes loudspeaker 1, loudspeaker 2, angle sensor 56, and controller 58.

Loudspeaker 1 and loudspeaker 2 have the same configurations as loudspeaker 1 and loudspeaker 2 described in Embodiment 1 above. Loudspeaker 1 and loudspeaker 2 are configured so that angle θ (see FIG. 1B) that direction X1 (see FIG. 1B) in which loudspeaker 1 outputs a sound forms with direction X2 (see FIG. 1B) in which loudspeaker 2 outputs a sound is variable. More specifically, loudspeaker 1 and loudspeaker 2 are rotatable with respect to each other.

Angle sensor 56 detects angle θ described above. Angle sensor 56 outputs the detected angle θ to controller 58.

In response to angle θ detected by angle sensor 56, controller 58 adjusts a gain of an input sound signal to be inputted to input terminal 7 (see FIG. 3A). More specifically, controller 58 adjusts a gain of the input sound signal or inverted sound signal to be inputted to loudspeaker 1 and loudspeaker 2, for each frequency band. For example, controller 58 determines the gain corresponding to angle θ detected by angle sensor 56 for each frequency band, by reference to a correspondence table stored in a memory (not illustrated) and indicating a correspondence relationship between a gain and angle θ for each frequency band.

As shown in FIG. 24 and FIG. 25, the directional characteristics of the sound outputted from loudspeaker device 400 varies with angle θ for each frequency.

As shown in FIG. 24 for example, the directional characteristics for angles θ of 50° and 80° at 500 Hz of the frequency of the sound outputted from loudspeaker device 400 indicate that the sound pressure is lower overall, as compared with the directional characteristics for angles θ of 40°, 60°, 70°, and 90°.

As shown in FIG. 25 for example, the directional characteristics for angle θ of 80° at 2 kHz of the frequency of the sound outputted from loudspeaker device 400 indicate that the sound pressure is lower overall, as compared with the directional characteristics for angles θ of 40°, 50°, 60°, 70°, and 90°.

Thus, in response to angle θ of 50° detected by angle sensor 56 for example, controller 58 increases the gain of the input sound signal or inverted sound signal corresponding to the frequency of 500 Hz. In response to angle θ of 80° detected by angle sensor 56 for example, controller 58 increases the gains of the input sound signals or inverted sound signals corresponding to the frequencies of 500 Hz and 2 KHz.

In this way, even when the user changes angle θ to any angle by rotating loudspeaker 1 and loudspeaker 2 with respect to each other, unevenness in the directional characteristics among a plurality of frequencies can be reduced.

In addition to the configuration described above, if a correspondence relationship between angle θ and a height of loudspeaker device 400 from a floor is predetermined, controller 58 may obtain information about the height of loudspeaker device 400 from the floor. Then, controller 58 may adjust the gain of the input sound signal or inverted sound signal to be inputted to each of loudspeaker 1 and loudspeaker 2, on the basis of the obtained information about the height of loudspeaker device 400 from the floor.

[4-2. Advantageous Effects]

In the present embodiment, angle θ that the direction in which loudspeaker 1 outputs the sound forms with the direction in which loudspeaker 2 outputs the sound is variable.

Thus, an adjustment made to angle θ allows the directional characteristics of a target frequency band or a range of the directionality to be adjusted.

Furthermore, loudspeaker device 400 according to the present embodiment further includes controller 58 that adjusts, in response to angle θ, a gain of the input sound signal or inverted sound signal to be inputted to loudspeaker 1 and loudspeaker 2.

Thus, even when the user changes angle θ to any angle by rotating loudspeaker 1 and loudspeaker 2 with respect to each other, unevenness in the directional characteristics among a plurality of frequencies can be reduced.

[Other Variations]

Embodiments 1 to 4 have been described thus far as examples of the technology disclosed in the present disclosure. However, the technology according to the present disclosure is not limited to these embodiments and is applicable to embodiments implemented through modification, substitution, addition, and omission as appropriate. Furthermore, a new embodiment may be implemented through a combination of structural components described in Embodiments 1 to 4.

The following are examples of other variations.

In the embodiments described above, loudspeaker device 100 (200, 300, or 400) faces upward or downward as an example of the overall orientation. The loudspeaker device may be oriented in any direction. For example, the loudspeaker device may face in a lateral or slanting direction.

In Embodiments 2 and 3 described above, loudspeaker devices **100*a* and 100*b* (100*a*, 100*b*, 100*c*, and 100*d*) included in loudspeaker device 200 (300) are in the in-line arrangement in a single row in the lateral direction. However, this is not intended to be limiting. For example, loudspeaker devices 100*a* and 100*b* (100*a*, 100*b*, 100*c*, and 100*d*) included in loudspeaker device 200 (300**) can be freely arranged on a plane.

Figure 26:
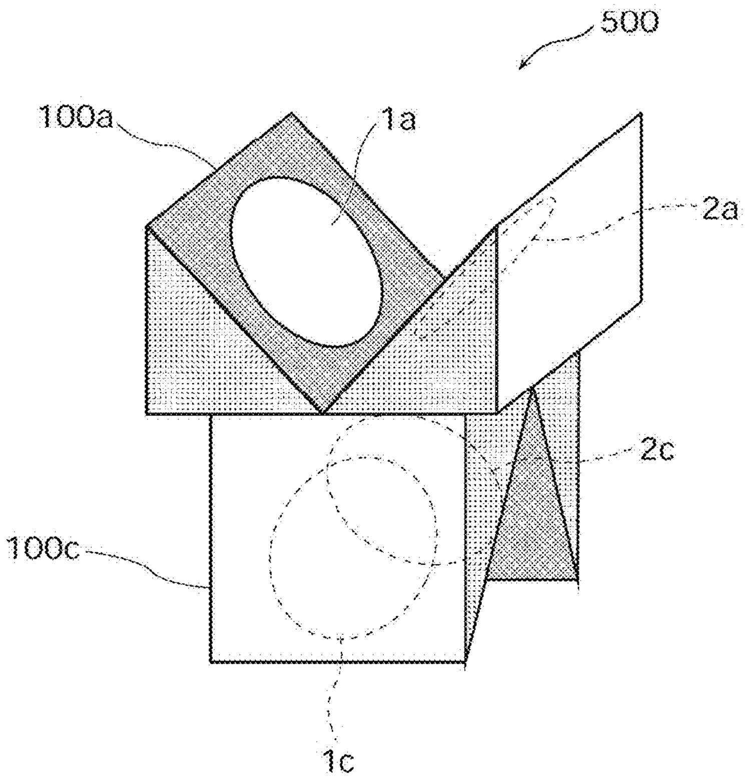
FIG. 26 is a perspective view illustrating a configuration of a loudspeaker device according to a variation.

Alternatively, a spatial arrangement including upward and downward facing orientations as illustrated in FIG. 26 may be used. FIG. 26 is a perspective view illustrating a configuration of loudspeaker device 500 according to a variation. As illustrated in FIG. 26, loudspeaker device 500 according to the variation includes loudspeaker device **100*a* that faces upward and loudspeaker device 100*c* that faces downward. Loudspeaker device 100*a* facing upward and loudspeaker device 100*c* facing downward are arranged adjacent to each other in the vertical direction. This arrangement enables generation of a more spatial sound field. For the configuration illustrated in FIG. 26, loudspeaker device 100*a* on the upper side may be used for outputting a usual sound, and loudspeaker device 100*c* on the lower side may be used for outputting a masking sound. In contrast this, loudspeaker device 100*a* on the upper side may be used for outputting a masking sound, and loudspeaker device 100*c*** on the lower side may be used for outputting a usual sound. Alternatively, two pairs of loudspeaker devices in a line array configuration may be arranged adjacent to each other in the vertical direction. In this case, the two pairs of loudspeaker devices may be arranged in a cross shape or arranged overlapping each other (that is, parallel to each other) when viewed from above. Furthermore, an increased number of loudspeaker devices in the vertical direction achieves the advantageous effect of Embodiments 2 and 3 more spatially.

Loudspeaker device 100 (200, 300, or 400) according to each of the embodiments described above includes phase switching circuit 6. Phase switching circuit 6 enables the sounds from loudspeaker 1 and loudspeaker 2 to be in phase or in antiphase with each other. However, this is not intended to be limiting. Loudspeaker device 100 need not include phase switching circuit 6, and may cause the sound signals from input terminal 7 to be in phase or in antiphase with each other. Then, loudspeaker 1 and loudspeaker 2 may output these signals. For example, in each of loudspeaker device **100*a* and loudspeaker device 100*b* for receiving the loudspeaker input signals according to Embodiment 3 above, input terminal 7 may be electrically connected to each of input terminal 10 and input terminal 11 to cause loudspeaker 1 and loudspeaker 2 to output the sounds in antiphase. Moreover, in each of loudspeaker device 100*c* and loudspeaker device 100*d* for receiving the masking signals according to Embodiment 3 above, input terminal 7 may be electrically connected to each of input terminal 10 and input terminal 11 to cause loudspeaker 1 and loudspeaker 2** to output the sounds in phase.

In loudspeaker device 300 according to Embodiment 3 above, the input sound signal (the loudspeaker input signal) and the masking signal are received from the input terminal. However, the way of externally receiving the sound signal is not limited to this. For example, loudspeaker device 300 may receive the input sound signal and the masking signal from a communication device. To be more specific, the communication device may input the input sound signal and the masking signal to loudspeaker device 300 through wired or wireless communication with an external sound reproduction device having a communication function. The communication device includes a central processing unit (CPU), a memory, and a communication interface. The communication interface of the communication device receives an input sound signal from the sound reproduction device and then outputs the received input sound signal to loudspeaker device 100*a* and loudspeaker device 100*b*. This enables loudspeaker device 100*a* and loudspeaker device 100*b* to output the sounds of the conference on the basis of the input sound signals. Furthermore, loudspeaker device 100*c* and loudspeaker device 100*d* output masking sounds based on masking signals previously stored in the memory of the communication device. At this time, to perform the sound signal control by loudspeaker device 300 according to Embodiment 3 above, the CPU of the communication device controls an amplification factor of an amplifier for each sound signal. Here, loudspeaker device 300 may include a storage medium, such as a memory, for storing a masking signal. Then, loudspeaker device 300 may read the masking signal from the storage medium and causes each of loudspeaker device 100*c* and loudspeaker device 100*d* to output a masking sound. Each of loudspeaker device 100, loudspeaker device 200, and loudspeaker device 400 according to Embodiments 1, 2, and 4 above may also receive the input sound signal from the communication device as in the above case.

In each of the embodiments described above, loudspeaker 1 and loudspeaker 2 are placed symmetrically with respect to reference place 3 so that the respective directions in which the sounds are outputted intersect with each other, and are also placed so that one of loudspeaker 1 and loudspeaker 2 is located in the direction in which the other outputs the sound. However, this is not intended to be limiting. Loudspeaker 1 and loudspeaker 2 may be placed symmetrically with respect to reference place 3 so that the respective directions in which the sounds are outputted intersect with each other, and may also be placed so that one of these loudspeakers is located in a direction opposite to the direction in which the other outputs the sound. To be more specific, loudspeaker 1 and loudspeaker 2 may be placed back to back with each other at an angle. Here, the phrase "one of these loudspeakers is located in a direction opposite to the direction in which the other outputs the sound" is described more specifically. For example, when loudspeaker 1 is viewed from the direction perpendicular to direction X1, loudspeaker 2 is located behind loudspeaker 1 (in a direction opposite to the direction in which the sound is outputted from loudspeaker 1) in the direction parallel to direction X1. In this case, loudspeaker device 100 (200, 300, or 400) takes the overall shape of a chevron-like enclosure. One of loudspeakers 1 and 2 is located on one slope of the enclosure, and the other is located on the other slope of the enclosure. Here, note that the sound field characteristics (the directionality characteristics) of loudspeaker device 100 when viewed from the lateral direction are sharper in the configurations described in Embodiments 1 to 4. Thus, the configurations according to Embodiments 1 to 4 are more preferred.

In each of the embodiments described above, phase switching circuit 6 keeps or inverts the phase of the input sound signal to be inputted to loudspeaker 1. However, this is not intended to be limiting. Any circuit that is capable of controlling the phase in loudspeaker device 100 (200, 300, or 400) according to the present disclosure can be used. For example, phase switching circuit 6 only has to switch the sound signals to be inputted to loudspeakers 1 and 2 between the in-phase state and the in-antiphase state by controlling the input sound signal.

Phase switching circuit 6 can be implemented in various ways. For example, phase switching circuit 6 may be configured with an electric selector switch or a relay, or may include a processor. The processor used as a control circuit reads a program from a storage medium that stores the program, and performs the program to execute various operations. In this case, a change made to the program stored in the storage medium can change the details of an operation. This increases the flexibility in changing the details of control. Examples of the processor include a CPU and a micro-processing unit (MPU). Examples of the storage medium include a hard disk, a flash memory, and an optical disk. Furthermore, a wired logic circuit, which allows no program rewriting, may be used as the control circuit. The wired logic circuit as the control circuit is useful for increasing the processing speed. Examples of the wired logic circuit include an application specific integrated circuit (ASIC). Alternatively, the control circuit may be implemented by a combination of a processor and a wired logic circuit. The control circuit implemented by the combination of the processor and the wired logic circuit increases the flexibility in software design and also increases the processing speed. Furthermore, the control circuit and another circuit having a different function may configure a single semiconductor element. Examples of the circuit having the different function include an A/D-D/A converter circuit. The control circuit may include a single semiconductor element or a plurality of semiconductor elements. For the configuration including the plurality of semiconductor elements, each of the controls described in claims may be implemented by a different semiconductor element. Furthermore, the control circuit may include a semiconductor element and a passive element, such as a resistor or a capacitor.

Each of the elements in each of the above embodiments may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

The above embodiments have been presented as examples of the technique disclosed according to the present application. The accompanying drawings and the detailed description are provided for this purpose.

Therefore, the components described in the accompanying drawings and the detailed description may include, in addition to components essential to overcoming problems, components that are not essential to overcoming problems but are included in order to exemplify the technique described above. Thus, those non-essential components should not be deemed essential due to the mere fact that the non-essential components are illustrated in the accompanying drawings and described in the detailed description.

The above embodiment is an example of the technique in the present disclosure, and thus various modifications, substitutions, additions, and omissions are possible in the scope of the claims and equivalent scopes thereof.

INDUSTRIAL APPLICABILITY

The present disclosure is applicable to a loudspeaker device that is controllable in directionality of a sound field.

More specifically, the present disclosure is applicable to a loudspeaker device or a spatial sound device that is used for a conference system.

The invention claimed is:

1. A loudspeaker device comprising:

a first loudspeaker that outputs a sound;

a second loudspeaker that is adjacent to the first loudspeaker in a predetermined direction and outputs a sound in a direction intersecting with a direction in which the first loudspeaker outputs the sound; and a phase control circuit that switches between a first switching state and a second switching state, the first switching state being a state in which an input sound signal is inputted to both the first loudspeaker and the second loudspeaker, the second switching state being a state in which the input sound signal is inputted to one of the first loudspeaker and the second loudspeaker while an inverted sound signal is inputted to an other of the first loudspeaker and the second loudspeaker, the inverted sound signal being obtained by inverting a phase of the input sound signal.

2. The loudspeaker device according to claim 1, wherein the direction in which the first loudspeaker outputs the sound forms an angle from 60° to 120° with the direction in which the second loudspeaker outputs the sound.

3. The loudspeaker device according to claim 1, wherein the first loudspeaker and the second loudspeaker are placed so that one of the first loudspeaker and the second loudspeaker is located in the direction in which an other outputs the sound.

4. The loudspeaker device according to claim 1 the loudspeaker device further comprising:

a third loudspeaker adjacent to the first loudspeaker and the second loudspeaker in a lateral direction intersecting with the predetermined direction, the third loudspeaker outputting a sound based on a sound signal different from the input sound signal and the inverted sound signal.

5. The loudspeaker device according to claim 1, wherein an angle that the direction in which the first loudspeaker outputs the sound forms with the direction in which the second loudspeaker outputs the sound is variable.

6. The loudspeaker device according to claim 5, the loudspeaker device further comprising:

a controller that adjusts, in response to the angle, a gain of one of the input sound signal and the inverted sound signal to be inputted to the first loudspeaker and the second loudspeaker.

7. The loudspeaker device according to claim 1, wherein the loudspeaker device includes a plurality of pairs of the first loudspeaker and the second loudspeaker, and the plurality of pairs of the first loudspeaker and the second loudspeaker form a line array configuration in a lateral direction intersecting with the predetermined direction.

8. The loudspeaker device according to claim 1, the loudspeaker device further comprising:

an input terminal that receives the input sound signal, wherein the phase control circuit determines whether to output the input sound signal received from the input terminal or the inverted sound signal obtained by inverting the phase of the input sound signal, in the first switching state, the input sound signal outputted from the phase control circuit is inputted to the first loudspeaker and the input sound signal from the input terminal is inputted to the second loudspeaker, and in the second switching state, the inverted sound signal outputted from the phase control circuit is inputted to the first loudspeaker and the input sound signal from the input terminal is inputted to the second loudspeaker.

* * * * *